(12) United States Patent
Cook et al.

(10) Patent No.: US 7,395,241 B1
(45) Date of Patent: Jul. 1, 2008

(54) CONSUMER-DIRECTED FINANCIAL TRANSFERS USING AUTOMATED CLEARINGHOUSE NETWORKS

(75) Inventors: Scott D. Cook, Woodside, CA (US); Rene A. Lacerte, Emerald Hills, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 09/487,233

(22) Filed: Jan. 19, 2000

(51) Int. Cl.
*G06Q 40/00* (2006.01)
(52) U.S. Cl. .................. 705/39; 40/42; 40/43; 40/45; 40/78; 382/137; 235/379
(58) Field of Classification Search ............. 705/39–40, 705/43, 45, 42, 78; 235/379; 283/58, 67; 382/137
See application file for complete search history.

(56) References Cited

U.S. PATENT DOCUMENTS

| | | |
|---|---|---|
| 3,652,795 A | 3/1972 | Wolf et al. |
| 4,321,672 A | 3/1982 | Braun et al. ................ 364/408 |
| 4,341,951 A | 7/1982 | Benton ........................ 235/379 |
| 4,454,414 A | 6/1984 | Benton ........................ 235/379 |
| 4,645,873 A | 2/1987 | Chomet ......................... 379/93 |
| 4,713,761 A | 12/1987 | Sharpe et al. ................ 364/406 |
| 4,750,119 A | 6/1988 | Cohen et al. ................ 364/401 |
| 4,823,264 A | 4/1989 | Deming ....................... 364/408 |
| RE32,985 E | 7/1989 | Nagata et al. ................ 364/401 |
| 4,866,611 A | 9/1989 | Cree et al. ................... 364/300 |
| 4,941,090 A | 7/1990 | McCarthy .................... 364/405 |
| 5,010,485 A | 4/1991 | Bigari .......................... 364/408 |
| 5,025,372 A | 6/1991 | Burton et al. ................ 364/406 |
| 5,220,501 A | 6/1993 | Lawlor et al. ............... 364/408 |
| 5,231,571 A | 7/1993 | D'Agnostino ............... 364/408 |
| 5,351,296 A | 9/1994 | Sullivan ........................ 380/24 |

(Continued)

OTHER PUBLICATIONS

Chevy Chase Bank, 1996, "Chevy Chase Home Banking Chevy chase Financial Manager".*

(Continued)

*Primary Examiner*—Harish T Dass
(74) *Attorney, Agent, or Firm*—Osha • Liang LLP

(57) ABSTRACT

Consumer directed transfers of funds over the Internet are provided by a combination of systems and networks, including the Internet, email, and the Automated Clearinghouse system (ACH). A host system provided by a funds transfer service manages requests of senders to transfer funds and further manages responses of receivers to claim funds. The host system allows the sender to initiate the funds transfer by specifying the amount of the transfer and information for contacting the receiver, without the need to specify the account of the receiver for receiving the funds. Instead, the host system contacts the receiver and informs the receiver of the available funds; the receiver can then provide the necessary target account information for completing the funds transfer. The ACH is used to effect the transfer of funds, with the host system providing instructions for ACH entries to its financial institution using account information separately received from the sender and receiver. The credit risk associated with originating ACH entries is reduced by use of the Point of Sale system to verify sufficient funds in the sender's account by comparing the closing balance of the day the funds transfer is requested with the transfer amount. Sender fraud is reduced by comparing a sender provided balance (or check number/amounts) with an account balance acquired through automated means such as the POS system or ATM network.

19 Claims, 13 Drawing Sheets

U.S. PATENT DOCUMENTS

| | | | | |
|---|---|---|---|---|
| 5,383,113 | A | 1/1995 | Kight et al. | 364/401 |
| 5,440,634 | A | 8/1995 | Jones et al. | 380/24 |
| 5,453,601 | A | 9/1995 | Rosen | 235/379 |
| 5,455,407 | A | 10/1995 | Rosen | 235/380 |
| 5,557,516 | A | 9/1996 | Hogan | 364/406 |
| 5,581,764 | A | 12/1996 | Fitzgerald et al. | 395/703 |
| 5,623,547 | A | 4/1997 | Jones et al. | 380/24 |
| 5,659,165 | A | 8/1997 | Jennings et al. | 235/379 |
| 5,692,132 | A | 11/1997 | Hogan | 395/227 |
| 5,699,528 | A | 12/1997 | Hogan | 395/240 |
| 5,799,087 | A | 8/1998 | Rosen | 380/24 |
| 5,815,657 | A | 9/1998 | Williams et al. | 395/186 |
| 5,832,463 | A | 11/1998 | Funk | 705/35 |
| 5,873,072 | A | 2/1999 | Kight et al. | 704/40 |
| 5,884,288 | A * | 3/1999 | Chang et al. | 705/40 |
| 5,884,312 | A | 3/1999 | Dustan et al. | 707/10 |
| 5,890,140 | A | 3/1999 | Clark et al. | 705/35 |
| 5,903,881 | A * | 5/1999 | Schrader et al. | 705/42 |
| 5,920,629 | A | 7/1999 | Rosen | 380/24 |
| 5,946,667 | A | 8/1999 | Tull, Jr. et al. | 705/36 |
| 5,953,423 | A | 9/1999 | Rosen | 380/24 |
| 5,956,391 | A | 9/1999 | Melen et al. | 379/114 |
| 5,956,700 | A | 9/1999 | Landry | 705/40 |
| 5,966,696 | A | 10/1999 | Giraud | 705/14 |
| 5,966,698 | A | 10/1999 | Pollin | 705/34 |
| 6,012,041 | A | 1/2000 | Brewer et al. | 705/34 |
| 6,012,044 | A | 1/2000 | Maggioncalda et al. | 705/36 |
| 6,012,045 | A | 1/2000 | Barzilai et al. | 705/37 |
| 6,012,048 | A | 1/2000 | Gustin et al. | 705/35 |
| 6,032,133 | A * | 2/2000 | Hilt et al. | 705/40 |
| 6,173,272 | B1 * | 1/2001 | Thomas et al. | 705/42 |
| 6,289,322 | B1 * | 9/2001 | Kitchen et al. | 705/40 |
| 2005/0131816 | A1 * | 6/2005 | Britto et al. | 705/39 |

OTHER PUBLICATIONS

Buck, S. Peter, 1997 "From electronic money to electronic cash: payment on the Net", Logistics Information Management. Bradford: 1997.vol. 10, Iss. 6; p. 289. Periodical ISSN/ISBN: 09576053.*

BusinessWire, Dec. 8, 1999 "Intuit and Microsoft Advance Financial Info ExPetere on the Internet; Propose New Features for Open Financial ExPetere Version 2.0" Business Editors and High Tech Writers. Business Wire. New York: Dec. 8, 1999. p. 1.*

Bill Orr, "Microsoft/First Data: The instant giant of Internet bill payments", American Bankers Association. ABA Banking Journal. New York: Nov. 1997. vol. 89, Iss. 11; p. 95 (1 page).*

Jennifer Kingson Bloom "First Union—the Cyberbank—Seeking a Leg Up in Smart Cards", American Banker (pre-1997 Fulltext). New York, N.Y.: May 20, 1996. vol. 161, Iss. 96; p. 6.A.*

Rick Haliechuk, The wired wallet Imagine it: Electronic cash is coming soon. So is paper money on the way out? Can you protect your privacy? And will Bill Gates become your banker?; [Final Edition]; Toronto Star. Toronto Star. Toronto, Ont.: Aug. 19, 1995.*

*Operating Circular* No. 1, *Account Relationships*, Federal Reserve Bank of New York, Jan. 1998.

*Operating Circular* No. 4, *Automated Clearing House Items* with Appendix A-D, Federal Reserve Bank of New York, Jan. 1998.

*Operating Circular* No. 5, *Electronic Access*, Federal Reserve Bank of New York, Jan. 1998.

"Internet Banking: Letting Customers Have Their Way", U.S. Banker, pp. S-3 to S-20, Nov. 1997.

"Electronic Money: Toward a Virtual Wallet", *IEEE Spectrum Special Issue*, pp. 18-73, Feb. 1997.

"eCheck—Enabiling Universal Internet Payment", *CommerceNet* Brochure.

"Bank Hit by Crime Online", San Francisco *Chronicle*, B1, B5, Jan. 28, 2000.

Automated Clearing House Core Processing Software Bulletin, dated Dec. 1997, 2 pages, [online], from www.towergroup.com.

The Payments Authority Inc., Consumer Product Information, 7 pages, [online], from www.thepaymentsauthority.org.

PayPal Privacy Policy, 5 pages, [online], retrieved on Jul. 26, 1999 from www.paypal.com/cgi-bin/pageview.

Automated Clearing House Payments: Marking Research—Banking Information, 17 pages, [online], retrieved on Jan. 31, 2000 from www.stls.frb.org/banking/ach/achres.html.

Quick Cash, Internet Savings Bank, Business Banking, Personal Accounts and Investing with Paritate, 5 pages, [online], retrieved on Sep. 2, 1999 from www.paritate.1v/quickcash.htm.

Protect Your Company Against ACH Risk, Corporate Alliance Newsletters, 3 pages, [online], retrieved on Jan. 31, 2000 from www.comercia.com/comercia/ac/pa/1996/winter/story3_c.html.

HyperWallet Systems, Inc., The Way To Pay Online, 3 pages, [online], https://www.hyperwallet.com/index.jsp, 2002.

Nochex, Ltd., The UK's No. 1 Email Money Service, 3 pages, [online], http://www.nochex.com, 2003.

Anypay, What is Anypay?, 4 pages, [online], http://www.anypay.com/site/ml/eng/htm/home/home.htm, 2001.

Crone, Richard K., "A Guide to Channel Changing in Bill Payment", article from American Banker, Mar. 29, 1999, 2 pages.

Crone, Richard K., "Retail, Wholesale Must Unite to Bolster Direct Web Billing", reprinted from America Banker, The Daily Financial Services Newspaper, Jul. 14, 1998, 2 pages.

Crone, Richard K., "The Advantages of Having Bills Paid at Your Own Web Site", Billing World, Jan. 1998, 5 pages.

Crone, Richard K., "Opportunity on the Line", TeleTimes, No. 3, 1998, 4 pages.

CyberCash, Inc., 1998 Annual Report, 70 pages.

Crone, Richard K., "The Battle for Internet Bill Payment and Presentment", from Bank Technology News, Dec. 1997, 4 pages.

"Electronic Bill-Paying for the Little Guy", edited by Rothfeder, Jeffrey, Business Week, Sep. 25, 1989, 2 pages.

"Just Plain Bill", *ComputerLetter*, vol. 16, No. 4, pp. 1-5 (Jan. 2000).

"Small Change", *ComputerLetter*, vol. 12, No. 10, 4 pages (Mar. 1996).

*Payments Publications*, Herndon, VA, 21 pages, (1999).

* cited by examiner

CONSUMER-DIRECTED FINANCIAL TRANSFERS USING AUTOMATED CLEARINGHOUSE NETWORKS

BACKGROUND

1. Field of Invention

The present invention relates generally to electronically transferring funds between accounts, and more particularly, to consumer directed funds transfer mechanisms using automated clearinghouse networks.

2. Background of the Invention

There is presently a need for a fast, low cost mechanism by which individuals can electronically transfer funds to other individuals, businesses, and financial institutions. Currently, consumers have only a few, narrowly applicable mechanisms for electronically transferring funds to others, small businesses, or financial institutions. Debit cards are useful only for transferring funds to retail merchants that have machines that can read a debit card and access the Point of Sale (POS) system. Many businesses that are not retail outlets do not have the necessary POS terminals, and thus are unable to obtain funds from consumers in this manner. Likewise, other individuals to whom a consumer would desire to transfer funds—friends, relatives, servicemen and repairmen—do not have POS terminals, and thus cannot use this system for transferring funds.

In some cases, a consumer has a need to transfer funds between accounts at different financial institutions, such as from a bank account at a bank to a brokerage account at a brokerage firm. The POS is not designed to support this type of transfer, and further, even if it were, financial institutions generally do not have POS terminals. Finally, there is a need to transfer funds remotely (e.g. over the Internet) where a debit card/POS machine system cannot be used since there is no physical presence of the sender's debit card and the receiver's POS machine available.

Electronic wire transfers are one alternative for funds transfers. Wire transfers are fast and can even be initiated over the telephone, and are typically transacted the same day. However, they are very expensive, typically $10-$25 if done by the sender's bank; retail wire transfers, such as through Western Union or MoneyGram, can be even more expensive, since they are priced at about 8-10% of the transfer amount. Retail wire transfers also inconvenience the recipient, by requiring the recipient to travel to a local retail outlet to receive the funds in cash, and then to travel to his bank to deposit the funds in a bank account. The high cost and inconvenience essentially eliminates wire transfers as an effective and useful tool for consumers to use for small funds transfers.

Bill payment services, such as CheckFree, provide limited types of funds transfers, and generally require the sender to be previously registered with the service to provide the sender's bank account information for verifying creditworthiness. For fully electronic transfers of funds to recipients, CheckFree requires the recipient—typically only a business—to also be previously registered and to have provided its bank account information as to the accounts designated to receive funds. For recipients who are unregistered, CheckFree will mail a check, which may take several more days to arrive, which require the recipient to manually deposit into its account, and often several days to clear.

Credit cards payments are also fast, but can be used to transfer funds only to authorized merchants—not individuals, many small businesses, and financial institutions. Credit card processors also impose their own costs, typically charging the receiving merchant 2-4% for card-not-present payment and a minimum around $25 per month for servicing the merchant, along with hundreds of dollars of setup and equipment costs for the receiver—clearly making this impractical or impossible for households and many small businesses. The prevalence of credit card fraud is in part responsible for these high costs. In addition, the sender may have to pay high interest on the transferred funds—as a cash advance or a charge—which further reduces the desirability of this mechanism. Often the interest and fees equal an interest rate of 20%-40% per annum, a price so high it is repellant to many consumers. Finally, many consumers have bank accounts but do not have credit cards, making this system unavailable to them.

Between financial institutions themselves, various automated clearinghouse systems (ACH) are used to transfer funds at relatively low cost, typically $0.04 per transfer or less. However, by its very nature the ACH only services financial institutions directly, and corporate customers indirectly, but typically not individuals or small businesses. One reason for this is that by regulation, the sender ("originator" in ACH parlance) of an ACH transfer must specify the routing/transit number and the account number of the recipient ("receiver") before sending the transaction. That is, in order to transfer money to another person's bank account, the sender must know that person's bank account number and the routing/transit number of the receiver's bank. While the recipient may be willing to provide this information to some senders—for example, to the recipient's employer to receive direct payroll deposits—the typical consumer is unlikely to have this information about infrequent or casual recipients (e.g. businesses, friends, relatives). Obtaining this information may often not even be possible, since recipients may not want to release this information to potential senders. Thus, ACH transfers are typically limited to corporate customers who have pre-existing relationships with financial institutions, that is, who are registered with their financial institution ahead of time to send and receive ACH transfers, and who have received pre-authorizations from others to transfer funds to and from their accounts.

Thus, most banks and other financial institutions connected to the ACH simply are not set up to provide ACH transfers for consumers to make transfers to individuals or small businesses. First, ACH regulations inhibit this practice by requiring the account information of both the sender and the receiver of an ACH transfer to be specified in transaction, as mentioned above. In practice, an ACH transfer requires both the sender and the receiver to have previously registered with their respective financial institution to originate ACH entries. Consumers are hardly likely to so register with their financial institutions for the occasional ACH transfer to a friend, relative, or business. Another barrier is that the financial institutions typically require the sender to physically visit a branch for at least the first transfer, making this process even more inconvenient.

Another reason that financial institutions do not provide ACH transfers directly to consumers is that originating financial institutions ("ODFI's" in ACH parlance) bear the credit risk of insufficient funds. When an originating financial institution releases a credit entry (payment to another account from the originating financial institution, e.g. direct payroll deposit) on behalf of a sender, the institution is liable for the funds. Because of this, banks will often not accept originating transactions from a sender unless the sender has an account at the ODFI. This allows the ODFI to directly verify that the sender has sufficient funds before sending the credit entry; if the sender does not have sufficient funds, the credit entry is refused. However, this restriction eliminates the financial institutions from directly providing a funds transfer service to the public in general, since the average consumer is not going to open a bank account at a bank in order to do a single funds transfer.

However, the real risk to financial institutions is not the credit risk from credit entries—since the financial institution can immediately check the sender's balance. Rather, the credit risk arises when an originator requests a debit from another entity's bank account, that is, when the originator requests to withdraw money from another party's account. In this case, since the "paying" party can repudiate the debit after the fact, the originator's financial institution must be sure that the originator has sufficient credit to cover the return of the funds to the paying party. Since this return may occur well after the original debit was made, the financial institution must be sure that the originator is creditworthy.

Opening up the ACH to individual consumers would seriously expose a financial institution to increased credit risk in the absence of a means of ensuring sufficient funds for all transactions. For this reason, originating financial institutions employ careful procedures to select which corporate customers on whose behalf it will originate credit entries, typically limiting ACH transfers to reliable corporate customers with sufficient account sizes to accommodate the anticipated transfer activity.

Accordingly, it is desirable to provide a low cost, fast, and ubiquitously available mechanism for the electronic transfer of funds. A desirable system would allow a consumer to transfer funds to any other individual, business, or financial institution account, without previous knowledge of the recipient's account number. Other desirable features would prevent or reduce the likelihood of fraud in such funds transfers.

SUMMARY OF THE INVENTION

The present invention overcomes the limitations of conventional electronic funds transfer mechanisms by providing a low cost, fast, and almost ubiquitously available mechanism for electronically transferring funds using a combination of the Internet and an automated clearinghouse (ACH) system. Automated online systems such as the Point of Sale (POS) system are optionally used to reduce the likelihood of various types of fraud, including falsification of recipient identity, insufficient funds, and the like.

In one aspect, the present invention separates an ACH funds transfer into two distinct phases. In a first phase, the sender provides information defining the amount of the transfer, the source of the funds, and information for contacting the receiver of the funds. This information by itself is insufficient to process a complete ACH transfer of the funds to the receiver. In a second phase, the receiver of the funds separately provides information designating the target account for the funds transfer. The combined information from the sender and receiver is sufficient to complete the transfer the funds via the ACH. In one embodiment, a neutral third party, such as a funds transfer service, collects the information from the sender and receiver and provides instructions to a financial institution to effect the appropriate ACH entries for transferring the funds.

For example, in one embodiment of the present invention a sender provides his own account information identifying the routing/transit number of his financial institution and the account number of the source account from which the funds will be transferred, the amount of the transfer, and sufficient contact information to contact the recipient. In one embodiment, the sender provides the email address of the recipient as the mechanism for contacting the recipient. Where the funds transfer is a payment to a business, the sender may optionally provide a business account number of the sender's account with the business, which it can use to identify the sender and direct the payment to the appropriate account. This information is provided to a host system, preferably, though not exclusively, through a web-based interface to the host; in another embodiment, the information is provided to the host over a telephone, by email to the host system, or by other communication mechanisms. Note that at this point, unlike conventional ACH transfers or wire transfers, the sender has not identified the account number and the routing/transit number of the recipient and the sender need never know this confidential information of the recipient.

The host system is in communication with its own financial institution at which it maintains an account. The host system provides an instruction to its financial institution, requesting it to collect the specified transfer amount from the sender's account. This instruction may be communicated from the host to its financial institution over any variety of electronic communications mechanisms.

The host system's financial institution executes an ACH debit, specifying the sender's account number and routing/transit number as the source account, the specified transfer amount, and the target account, which is that of the host system. The ACH network effects this debit, and requests withdrawal of the transfer funds from the sender's account, transferring these funds to the host system's account.

In this embodiment, the host system contacts the recipient using the contact information provided by the sender, and indicating that the recipient is to receive a funds transfer. The amount of the transfer and the name of the sender may also be specified. If the funds transfer is a payment to a business, the sender's business account number may also be provided to the recipient at this point. The recipient is requested to provide information designating the receiver's account, preferably the routing and transit number of its financial institution and the account number for the target account into which the recipient desires the funds to be transferred. If the recipient has already indicated through a previous transaction such information, the recipient may elect to send it to the previously assigned account.

In one embodiment, the recipient is contacted by the email address provided by the sender. This email provides one or more means for the recipient to contact the host system, including a web site address for the host system, telephone number, reply email, or the like. In an alternative embodiment, instead of the email address of the recipient, the sender provides a telephone number of the recipient. The host system then contacts the recipient at the telephone number, for example, using computer generated voice scripts that provide the same information as in the above described email. If the telephone number is that of the recipient's pager, then a page is sent, providing information by which the recipient can contact the host system. The host system may optionally provide a unique transaction ID to the recipient, or may simply use the recipient's email address (alone or in combination with other data) as a transaction identifier.

However contacted, the recipient replies to the host system with the routing and transit number and the account number of the desired target account or other account identification information for the desired account. If the optional transaction ID has been provided, the recipient may also provide this to the host. Various means may be used by the recipient to provide this information to the host system. In one embodiment, the host system maintains a web site that the recipient can access to identify himself and provide his account information; alternatively, the recipient may contact the host system by telephone to provide this information.

These steps of contacting the recipient and obtaining the recipient's routing and transit numbers occur before or after the above steps of the host system initiating the first ACH transfer.

After the host system has received the recipient's account designation information, it provides a second instruction to its financial institution, requesting the financial institution to transfer the specified transfer amount from the host's account to the recipient's account. The host's financial institution executes an ACH credit accordingly, which is effected by the ACH network. Due to the credit exposure unique to each sender, the host may decide to hold the funds in its account until the risk of a return entry is lower before initiating the second instruction set.

The host then preferably informs the recipient that payment has been effected, for example, by sending an email to the recipient, or telephoning the recipient. The recipient can access the funds directly from their account. The point at which the host notifies the recipient to access the funds is variable. In some embodiments, the host will notify after sufficient time for the ACH instructions to be received at the recipient's financial institution.

One advantage of the funds transfer process of the present invention is its convenience to both the sender and the receiver: neither party has to go to a bank, retail outlet or other facility to initiate or receive the funds. The information used to conduct the transfer is obtained by the host electronically, and the funds are electronically transferred between the sender's account and the receiver's account. Second, neither party is required to use a credit card or a debit card in conjunction with their various card-reading apparatuses.

Another advantage is that because of the low cost of the ACH transfers, the business managing the host system can price this service at a very reasonable price, well below the current cost of wire transfers, or credit card service fees and interest rates. The service may even be provided for free, with revenue obtained from advertisements placed on the web site used by the host to obtain the transaction information.

A further advantage is that neither the sender nor the recipient has to be previously registered with its financial institution (or with the business managing the host system) prior to the transaction to participate in ACH transfers. More significantly, the sender does not have to have any prior knowledge about the recipient's account in order to initiate the funds transfer. The only information the sender needs is information sufficient to contact the recipient, such as the recipient's name, or its email address, telephone number, or the like, information that is readily available and easily obtained. Thus, the present invention enables individuals to quickly and efficiently transfer funds to others, such as friends or relatives, make electronic payments to small businesses directly (instead of by check or "online bill payment" which is still check-based), and transfer funds between financial institutions. A final advantage of the present invention is that the funds transfer process can take place without any human intervention or assistance to the sender or the receiver.

The present invention may be used for various different types of funds transfers. These include payments to individuals, payments to businesses, payments to tax authorities, transfers between the sender's own accounts at different financial institutions, payments for online purchases, and online bill payment.

For example, payments to businesses may be conducted in at least two different ways. Certain businesses may choose to register with the host system, and provide ahead of time the routing/transit and account numbers that are to be used for receiving funds transfers. In this embodiment then, the sender—who need not be previously registered with the host system—provides the funds transfer amount (e.g. the amount of the bill they are paying), and identifies the business to transfer the funds to, but need not provide an email address or other contact information for the recipient, since this information is known already to the host. In this embodiment, the host does not contact the recipient as before, but rather initiates the two ACH transfers, first from the sender's account to its own, and then from its account to the recipient's. Since the business may be receiving many such funds transfers, it must know which of its customers' accounts to credit for each transfer. Accordingly, the host system sends this information (individually or in batches) to the recipient business, identifying each sender by its business account number with the business, and the amount of the funds transfer made by that sender. This allows the business to properly allocate the received funds and credit those customer's accounts with proper payment.

Payments to tax authorities are treated similarly, with the tax authority providing its target account information to the host system ahead of time.

Transfers between the sender's own accounts are particularly useful. Today, many people maintain accounts at multiple, unrelated financial institutions, such as checking and saving accounts at a bank, brokerage and investment accounts at a brokerage firm, CD's and other cash deposits at yet another institution. Normally, a customer has to manually transfer funds, by withdrawing it as cash or in a check from one institution and depositing it at another institution. With the present invention, the sender can specify himself as the recipient, and then provide the appropriate target account information for the target account of the transfer. In one embodiment for a web-based system, self-transfers may be handled in a single transaction, with the sender providing both the source and target account information to begin with, eliminating the step of the host contacting the recipient (here the sender) to obtain this information.

Payments to online vendors may also be made with the present invention, providing a convenient and effective payment system for transactions on the World Wide Web. In this embodiment, the sender is assumed to be shopping at an online store or service, or the like. To effect payment for a purchase, an unregistered sender again provides the appropriate source account designation information for its source account (if sender has previously registered with the host, then the sender would not have to edit the account information each time unless she decides to change the source account for a payment). The online vendor couples this information with the routing/transit number and account number for its target account for receiving the payment, along with the payment amount. This information is forwarded over the Web to the host system, which again effects the appropriate ACH transfers, as described above.

Online bill presentment and payment is yet another transaction that may be enhanced by the present invention. Here, a business electronically transmits a billing statement to the sender, for example by email or by the sender visiting the business's web site and inputting the appropriate business account information to obtain access to an online bill. In either case, the user is provided with a button, hyperlink or the like to initiate payment. An unregistered sender provides her source account information, which is coupled with the target account information from the business, along with the bill amount, and the sender's account data for its account at the business, or the invoice number. Preferably, the host system receives the sender's information directly from the sender, and couples it with the receiver's account information. The host effects the appropriate ACH transfers to effect the payment of the bill.

The present invention further contemplates variations in the sources and targets of funds. The types of accounts used as the source or target accounts may be varied, for example, using credit card accounts, lines of credit, tax refund accounts, or other accounts held by a financial institution. Thus, in one embodiment, the sender's source account is a credit card account, with the credit card number being provided by the sender. The host system charges the sender's credit card account for the transfer amount, but then uses ACH to transfer the funds to the recipient's account. Likewise, the recipient may provide a credit card number as the target account. The sender may also use a line of credit as the source account. The sender may also use a tax refund account held by a tax preparer as the source of funds.

In another aspect, the present invention provides means for reducing the various types of risk associated with these funds transfers. One of the inherent risks of the ACH system is credit risk, as mentioned above. In the ACH system, whoever initiates a transfer of funds, bears the risk that the funds are indeed available for the transfer. This is because in the ACH, once funds are received in a recipient's account, it is assumed that the funds are legitimate, and the recipient is allowed to immediately withdraw the funds. If the funds were in fact not available, e.g. insufficient funds or false account numbers, then the initiator is responsible for the shortfall. In one embodiment of the present invention, the host's financial institution sends a debit entry through the ACH system to collect the transfer amount from the sender's source account, and also sends a credit entry to transfer the funds from the host's account to the recipient. Later, such as 1-2 days, the host's financial institution will learn whether the sender's source account had sufficient funds to cover the transfer amount. If the sender did not have sufficient funds, then the host system's financial institution will deduct the transfer amount from the host's account to cover the transfer. However, assuming the host system has already transferred the funds to the recipient, then the host bears the loss of the transfer funds. This places the host system at risk for various types of fraud (e.g. false account numbers) or collusion.

For example, assume that the sender has a bank account with $100 in it. The sender may instruct the host system to transfer $100 to a recipient. On the same day, the sender may also withdraw the $100 in cash from this account. This withdrawal is immediate, yet the funds transfer by the ACH does not clear until at least after midnight of that same day. Initially, the sender's financial institution will pay the $100 debit on the sender's account and provide the $100 to the host. Later, when the sender's financial institution determines that the sender had insufficient funds, it will send a return item to the host's financial institution and obtain the $100 back. As a result, the host's financial institution will debit the $100 from the host system's account. The host system, if it has already instructed the funds transfer to the recipient, cannot go back and demand the recipient return the $100. The host system has thus lost $100.

The present invention reduces this risk by novel uses of automated mechanisms having access to the sender's account balance, such as the Point of Sale (POS) system. The POS allows access to the current account balance and the last five or ten transactions in an account. This feature of the present invention operates as follows: The first ACH debit is effected to transfer the funds from the sender's source account to the host system's account. After the sender's financial institution clears the first ACH debit in its overnight cycle, the host system checks the available funds balance of the sender's source account using an automated system, such as the POS system. If the sender's source account balance is greater than the transfer amount, then the transfer must be "good." This is because there would be generally no reason for the sender's financial institution to deny the debit on the sender's account if there were more than enough funds to cover the debit. The host system then contacts the recipient (where the recipient target account information is needed) or automatically instructs the second ACH credit entry. If the balance is less than the transfer amount, then the answer is indeterminate, since the debit may have cleared and simply reduced the sender's balance.

For example, assume the sender requests a funds transfer of $100, and that the next morning the sender's balance is $1,000. Then the transfer must have cleared since there would typically be no reason for the sender's institution not to debit the $100 from this balance. On the other hand if the balance the next morning is $75, then the debit may have cleared (e.g., the sender's prior balance was $175) or may have been rejected (e.g., where the sender's prior balance was only $75).

In a further credit risk reduction method, the host does not contact the recipient until at least one day after the first ACH debit is cleared. This is because the overwhelming majority of ACH transactions are repudiated within one day. Thus, this technique is likely to further reduce the credit risk of insufficient funds.

Another type of risk in any type of funds transfer system is fraud. This includes sender fraud (e.g. false account numbers) and interloper fraud (e.g. third parties posing as legitimate senders or as the host system). The present invention further provides various mechanisms to reduce the likelihood of sender's providing false account numbers. Generally, these mechanisms operate as follows: Before the transaction is completed, the sender provides to the host system current, specific information derived from account transactions in source account. This source account activity information is of a type and nature that only the legitimate owner or user of the source account would know. The information is current in that is preferably derived from recent transactions, such as transactions occurring within the past several banking days. This source account activity information is compared with similar activity information obtained from online systems having authorized access to information about the source account. If the comparison of information is successful, the identity of the sender is confirmed and the transfer proceeds; if the comparison is negative, then the funds transfer is canceled, or the sender is given an opportunity to change the source account information.

In one embodiment, the source account activity information is the current account balance. When a sender first attempts to transfer funds, he provides the current balance of the source account to the host system. This information is typically something that only the actual account holder is likely to have. This activity information is typically available to senders via their ATM card and an ATM machine, or over the telephone to their bank or financial institution, or online from their financial institution. The host system compares the sender's provided account balance with an account balance obtained using an online system, such as the POS system. If the balances match (or match within a tolerance for intra-day variations), then the host system has confirmed that the sender's account number is legitimate and that the sender is an authorized user of the account. This verification step may be taken each time a particular sender wishes to transfer funds, with only selected transfers, or alternatively, may be done just the first time a sender transfers funds, after which the sender is automatically registered with the host system for future funds transfers from the specified source account. A later change in the source account by the sender invokes a balance verification process. Alternatively, the source account activity information may be some number of recently written checks on the source account, including check numbers and amounts. Again, this information as provided by the sender may be compared with information obtained online, for example, using the POS system. A match of check number and amounts again serves to authenticate the sender.

Advantageously, this aspect of the invention enables the host to verify that the sender controls the source account without needing any of the traditional and more cumbersome authentication means, such as sender signature, paper check provided by the sender, ID card physically checked in person, or pre-existing "secret" knowledge of the sender (e.g. birthplace or mother's maiden name).

The present invention may be embodied in various forms. In one embodiment, the present invention includes a host system that is communicatively coupled to its financial institution in order to provide instructions relating the ACH entries. The host system is preferably further coupled to a web server hosting a web site. The web site includes pages for senders to initiate funds transfers by providing their own account information identifying the routing/transit number of its financial institution and the account number of the source account from which the funds will be transferred, the amount of the transfer, and sufficient contact information to contact the recipient. The web site further includes pages (typically automatically generated from database information) for receivers to provide their target account information. The host system includes a database into which transactions are stored, including the various sender and receiver information. The host system includes an email server and email generation system to generate emails to receivers to notify them of the funds transfer. The host system may also include an interface to an interactive voice response system that includes scripts for receiving sender or recipient information.

DETAILED DESCRIPTION OF THE PREFERRED EMBODIMENTS

Figure 1:
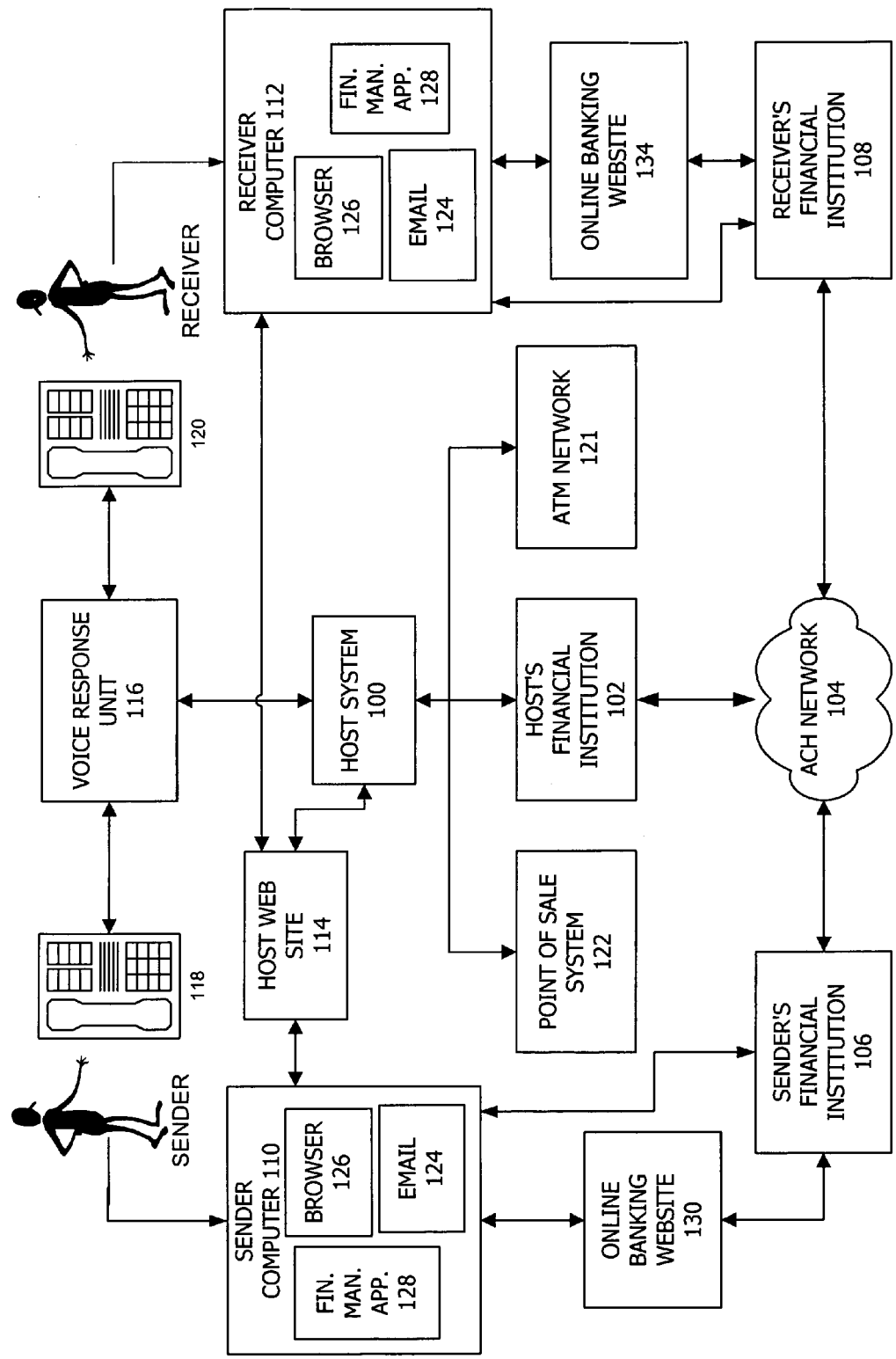
FIG. 1 is an illustration of a combination of systems in accordance with the present invention.
Figure 13:
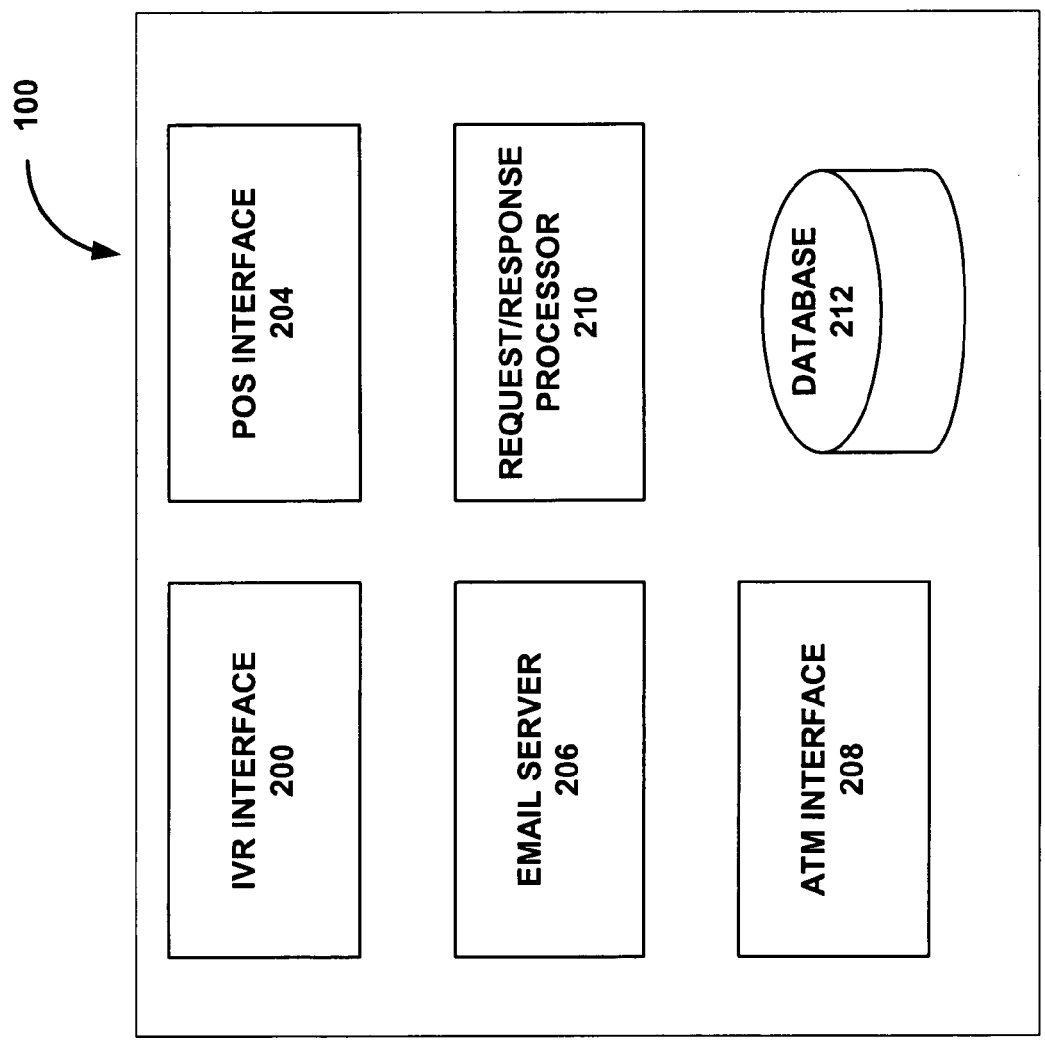
FIG. 13 is a functional block diagram of a host system in accordance with the present invention.

I. System Overview
II. Process Overview
III. Transferring Funds Between an Unregistered Sender and an Unregistered Receiver
IV. Transferring Money Between an Unregistered Sender and a Registered Business
V. Handling Risk
   A. Verifying Sender Identity
      1) Identity Verification Using Current Source Account Activity Information
      2) Identity Verification Using Access to Notional Accounts of the Sender
   B. Verifying Sufficient Funds
   C. Unauthorized Receiver
VI. Additional Refinements and Embodiments
   A. Registration with Funds Transfer Service
   B. Automatic Updating of Financial Management Application Files
   C. Transfers Between an Individual's Accounts
   D. Payments to Tax Authorities
   E. Online Bill Presentment and Payment
   F. Payment for Web Purchases
   G. Alternative Source and Target Accounts
   H. Implementation Aspects
I. System Overview Referring now to FIG. 1 there is a shown a combination of systems in accordance with the present invention. The host system 100 provides the central locus of functional behavior for the present invention, handles requests by senders to transfer funds to receivers, handles responses by receivers to receive funds, and provides instructions to ACH members and other financial institutions for transferring funds in accordance with these requests and responses. The host system 100 operates on a conventional computer system, such as a workstation, mini- or mainframe class server computer, with sufficient storage and processing capacity to handle large volumes of transactions. The host system 100 preferably maintains a database 212 storing information about senders and receivers who have used the system (e.g. prior use to send or receive funds). FIG. 13 illustrates the basic software architecture of the host system 100 as it pertains to the present invention.

The host system 100 preferably operates in conjunction with a host web site 114 which provides an interface, accessible by conventional web browsers, by which senders and receivers can access the host system 100. The host web site 114 is supported by one or more conventional web servers, with sufficient capacity and throughput for high volume transactions. The host web site 114 is developed using conventional web development tools, including XML or HTML for pages, and supports standard web/internet protocols, including TCP/IP, HTTP, FTP, etc., and conventional security features, such as a firewall. The host web site 114 provides facilities for users (senders and receivers) to register with the host system 100 and store in its database 212 information identifying the users, their financial accounts, and other useful information. The database 212 may be relational, object oriented, or the other types, and implemented in existing database platforms such as Microsoft Corp.'s SQL Server, Oracle Corp.'s Oracle 8i, or Objectivity, Inc.'s Objectivity/DB.

The host system 100 optionally interfaces with and manages an interactive voice response (IVR) unit 116 via IVR interface 200, which allows senders and recipients to access the host system via the respective telephones 118, 120.

It is contemplated that the host system 100 will be operated by a business which provides the funds transfer services of the present invention to consumers and businesses. For purposes of clarity, this business will be designated the "funds transfer service," in order to distinguish it from other business enterprises that may use its services. The funds transfer service maintains a number of accounts at its financial institution 102 to be used in conjunction with the present invention. The funds transfer service has an originator relationship with its financial institution for originating ACH entries. Accordingly, the host system 100 communicates with this financial institution 102 for providing instructions regarding ACH entries to the financial institution 102. The communication between the host system 100 and its financial institution 102 is preferably by electronic means, such as email, direct modem connection, virtual private network over the Internet, or other means which provide reasonable security. The particulars of the communication protocols between the financial institution 102 and the host system 100 will normally be defined by the financial institution 102 as it deems fit to satisfy its throughput and security needs.

The host system 100 also preferably has an interface 204 to the Point of Sale (POS) system 122 sufficient to provide it with access to the standard features of the POS system 122, particularly the ability to query account balances and past transactions for a particular account. The host system 100 may also have an interface 208 to the ATM network 121.

The present invention operates to transfer funds between senders and receivers. A sender is an entity (e.g. person or a business) that desires to transfer funds to either itself or another entity. A receiver is a entity, which receives funds from another entity. A typical sender may be an individual or small business. A typical receiver may be a person (including the sender when transferring funds between his own accounts), a business at which the sender may or may not have a business account, or a tax authority to which the sender is providing a tax payment, or the like.

Both the sender and receiver hold respective accounts at various financial institutions 106 and 108. An account of the sender from which funds are transferred is referred to herein as a source account; an account of the receiver into which funds are received is referred to herein as a target account. In this disclosure, "financial account" or "account" refer to various types of banking or similar accounts maintained at financial institutions, and include checking, saving, money market, trust, investment, brokerage, credit card, line of credit, and loan accounts, and the like. This is distinct from a "business account" which is an accounts payable or receivable held by an entity (e.g. consumer) at a business for transacting purchases, making payments, and the like between the entity and the business. For example, a person would maintain a business account with their gas company into which payments for gas service are made.

All of the financial institutions 102, 106, and 108 are members of, and in communication with the automated clearinghouse (ACH) network 104, including their appropriate reserve banks, as defined by the various Operating Circulars of the Federal Reserve Banks (e.g. Operating Circulars, 1, 4, and 5) and by the ACH Rules, published by the National Automated Clearinghouse Association, all of which are incorporated by reference herein as needed. While use of the Federal Reserve Bank's ACH network 104 is preferred, use of other ACH networks 104 is within the scope of the present invention (e.g. VisaACH, MasterCard RPS, and regional ACH's such as NYACH, Arizonan ACH, ChaseACH, SWIFT, etc.). Accordingly, in the context of the present invention, the term "ACH" is to be understood to cover any of these types of automated clearinghouse associations, networks, and associations.

The host system 100 further includes a request/response processing module 210 that manages the requests for funds transfers, and responses by recipients in accordance with the functional process flows detailed below. The processing module 210 includes programming logic and data to generate electronic communications to a receiver to inform the receiver of a pending funds transfer and to obtain the target account information from the receiver. This programming logic and data may variously generate emails, web pages or instructions for the voice response unit 116.

The host system 100 further includes an email server 206 for receiving and generating email messages. The email server 206 complies with various email standards, for example Microsoft Corp.'s MAPI standard, or SMTP, or the like.

The host system 100 further includes a database 212 for optionally storing records of users of the system, transactions, and business information about participating business. More particularly, information on users includes a registered user table that stores information about each registered individual user of the system, including both senders and receivers. This table preferably includes:

contact information (e.g., name, address, telephone number(s), email address);
  financial account information (e.g. account numbers and routing/transit numbers);
  authentication information (e.g. user login and password); and
  business account information (e.g. business account numbers for a number of business, such as utility companies, small business, and the like to which the user may make payments).

This information on registered users is collected as it becomes available (e.g., as incidental to a person's use of the host web site 114 to send or receive funds) and by specific registration forms on the host web site 114.

A business user table may also be maintained that includes information on businesses identifies each business, its account information for receiving payments from others, contact information, and any supplemental information that qualifies, restricts, or otherwise amends its participation with the host system 100.

A transaction table is maintained that preferably includes information on each funds transfer, such as:
  transaction ID;
  the amount of the transfer;
  timestamp;
  sender and receiver information;
  description of transaction provided by sender (optional);
  status of the transfer; and
  other data as needed to authenticate the transaction.

The host system 100 further includes an interface for interfacing with the host web site 114 via a web server to receive data input by senders and receivers thereon, so that such data can be stored into and retrieved from the database 212.

Both the sender and the recipient preferably have computers 110, 112 that are capable of communicatively coupling to the host system 100, preferably over the Internet, such as by email 124 or by a web connection and browser interface 126 to the host web site 114. The present invention may entail communication by either the sender or the receiver with the host system 100 by other electronic means, such as via the voice response system 116.

The sender's computer 110 may also execute a financial management application 128 such as Intuit's Quicken® or QuickBooks®& or Microsoft Corp.'s Money®, or the like. This application provides various account management tools (e.g. account registers, reporting, online bill payment), and may provide business accounting features such as accounts payable/receivable tracking, and so forth. This application may be resident locally, and may communicate with the sender's financial institution directly, or with an online banking web site 130 of the sender's financial institution 106, which may be used to communicate with the host system 100. Alternatively, the application 128 may be a simple browser that accesses the online banking web site 130, and the host system's web site 114.

In some embodiments, the receiver's computer 112 may also execute a personal financial management application 128, which likewise may be locally resident, or a client of an online banking web site 134 of the receiver's financial institution 108.

The varieties of senders and receivers provides a number of distinct process flows for transferring funds within the scope of the present invention. Some of these process flows are now described.

II. Process Overview

Figure 2:
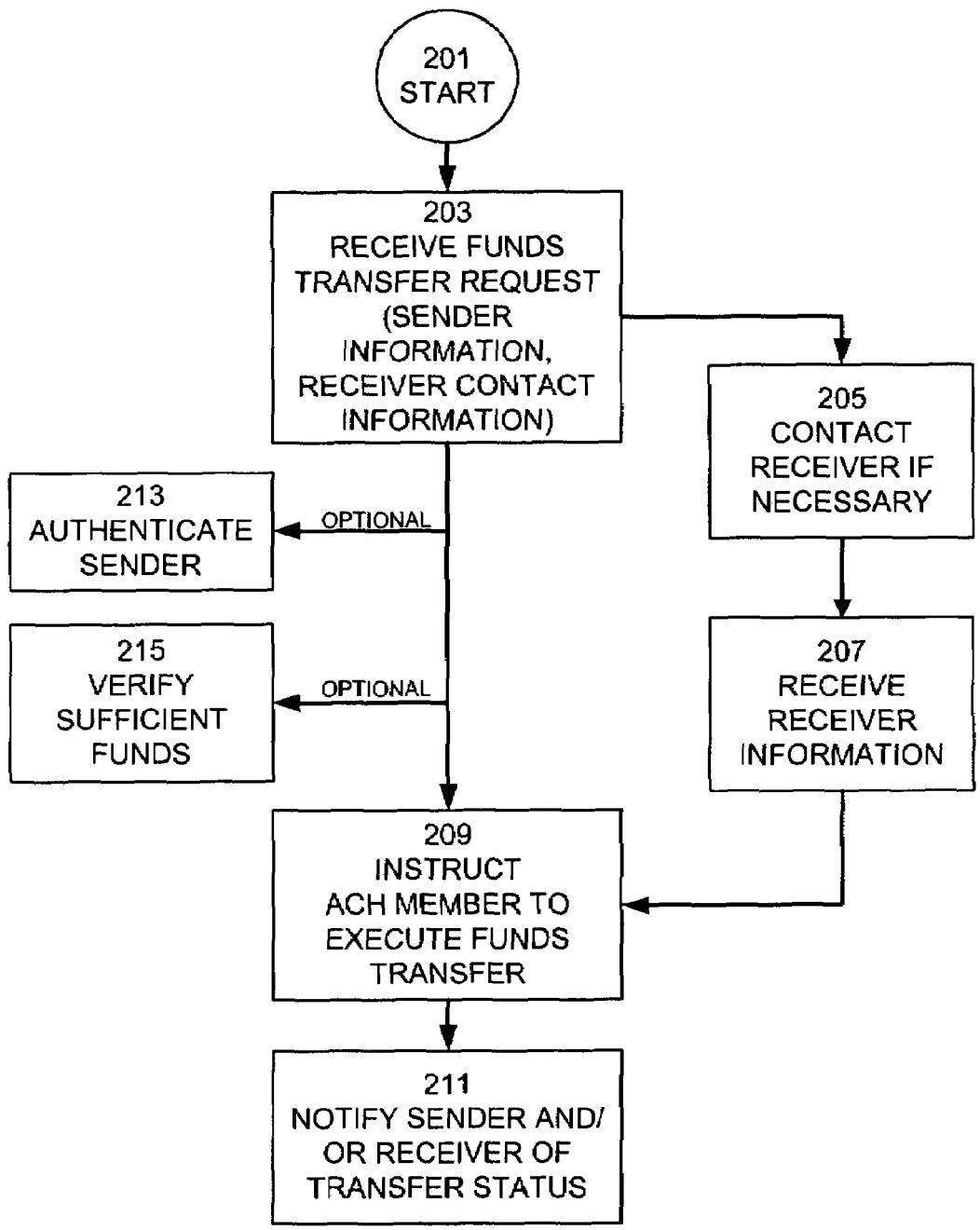
FIG. 2 is a flow diagram of the an overall process for transferring funds.

Referring now to FIG. 2, there is shown a flow diagram of an overall process flow in accordance with the present invention. This process typically begins with the sender providing and the host system 100 receiving 203 a funds transfer request. This request preferably includes information identifying the sender, the designation of the source account, and sufficient information for contacting the receiver.

The host system 100 contacts 205 the receiver if necessary to receive 207 the receiver information, including the designation of the receiver's target account into which the funds are to be transferred.

The host system 100 may optionally authenticate the sender 213, preferably by comparing information received from the sender regarding current account activity information of the source account with similar information obtained from automated systems. The host system 100 may also optionally verify 215 that there are sufficient funds in the source account, here too using automated systems having access to the source account. These processes may occur asynchronously with contacting the receiver and obtaining the receiver information.

Using the sender information and the receiver information, the host system 100 instructs 209 an ACH member to execute the various ACH debit and credit items appropriate to transfer funds between the sender's account and the receiver's target account. Because ACH items typically require the originator (here, the funds transfer service) to be a party to item, these instructions will generally include a debit on the sender's account into the host's account, and a credit from the host's account to the receiver's account.

The host system 100 may then notify the sender and/or the receiver of the status of the funds transfer, whether it was completed or denied for some reason.

The following discussion further details the various embodiments of this overall process flow.

Figure 3:
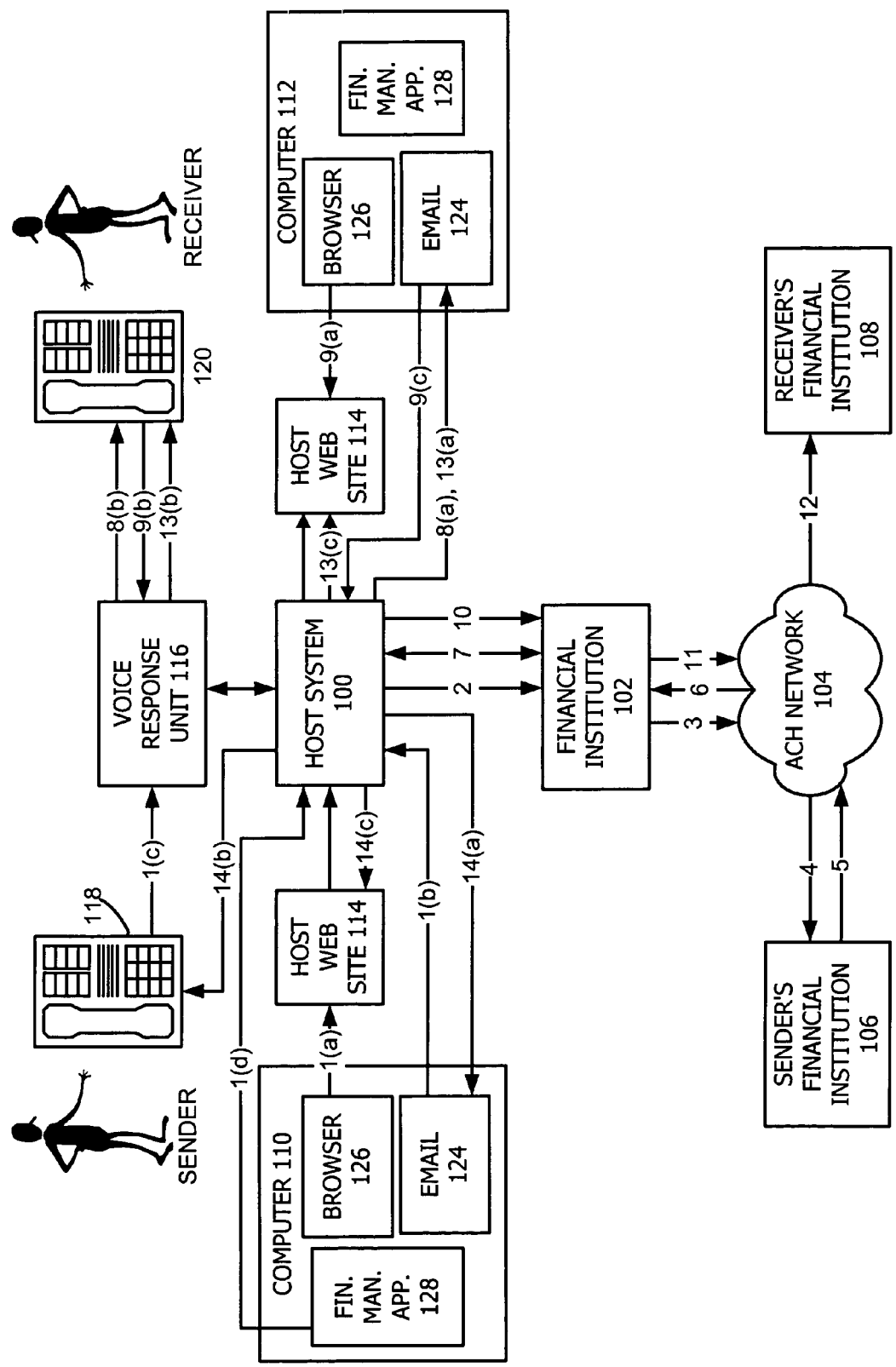
FIG. 3 is a flow diagram of the process of transferring funds between unregistered senders and receivers.

III. Transferring Funds Between an Unregistered Sender and an Unregistered Receiver Referring now to FIG. 3, there is shown the basic process flow for transferring funds from an unregistered sender to an unregistered receiver. An unregistered sender or receiver is a person or entity for whom the host system 100 does not already store in its database 212 information identifying the financial accounts of the entity at its financial institution. An unregistered user may be a person or a business. In the process flow that follows, the referenced operation numbers are illustrated in FIG. 3; references to unsubcripted numbers are understood to generally include the subscripted versions (e.g., "1" refers generally to "1(a)" through "1(d)"). The behavior of the host system 100 is managed by request/response processor 210.

Additionally, this process flow assumes a first embodiment where the source and target accounts are banking-type accounts, such as checking or saving account, or the like. Other types of accounts may be used, including those further described below.

1. The process begins with the sender communicating with the host system 100. The sender provides to the host system 100 information identifying the sender, the sender's source account information, the amount of funds to transfer to the receiver, and contact information for the receiver. In this first embodiment, the sender identifies the source account with a routing and transit number (if required for the type of account) and an account number. The sender provides contact information of the receiver preferably sufficient to allow the host system to automatically contact the recipient by a computer generated or mediated communication, for example, under the control of the processing module 210. The sender also preferably provides their own contact information, such as an email address or telephone number; the sender may optionally provide identification information such as their name, but the present invention will operate without such. The sender may optionally provide a description for the transfer (e.g., "Happy Birthday", or "Payment on Invoice #1234"). The host system 100 creates a record in its database 212 that logs this new transaction, assigning a transaction ID which can be used to retrieve and update the transaction at a later time. The host system 100 establishes an initial status of the transfer as pending or initiated.

Note that unlike conventional ACH transfers, the sender here 1) does not have to specify the receiver's account number or routing/transit number ahead of time; and 2) need not itself have an originator relationship with either its financial institution 106 or the funds transfer service's financial institution 102 in order to allow it to originate ACH entries.

Figure 4:
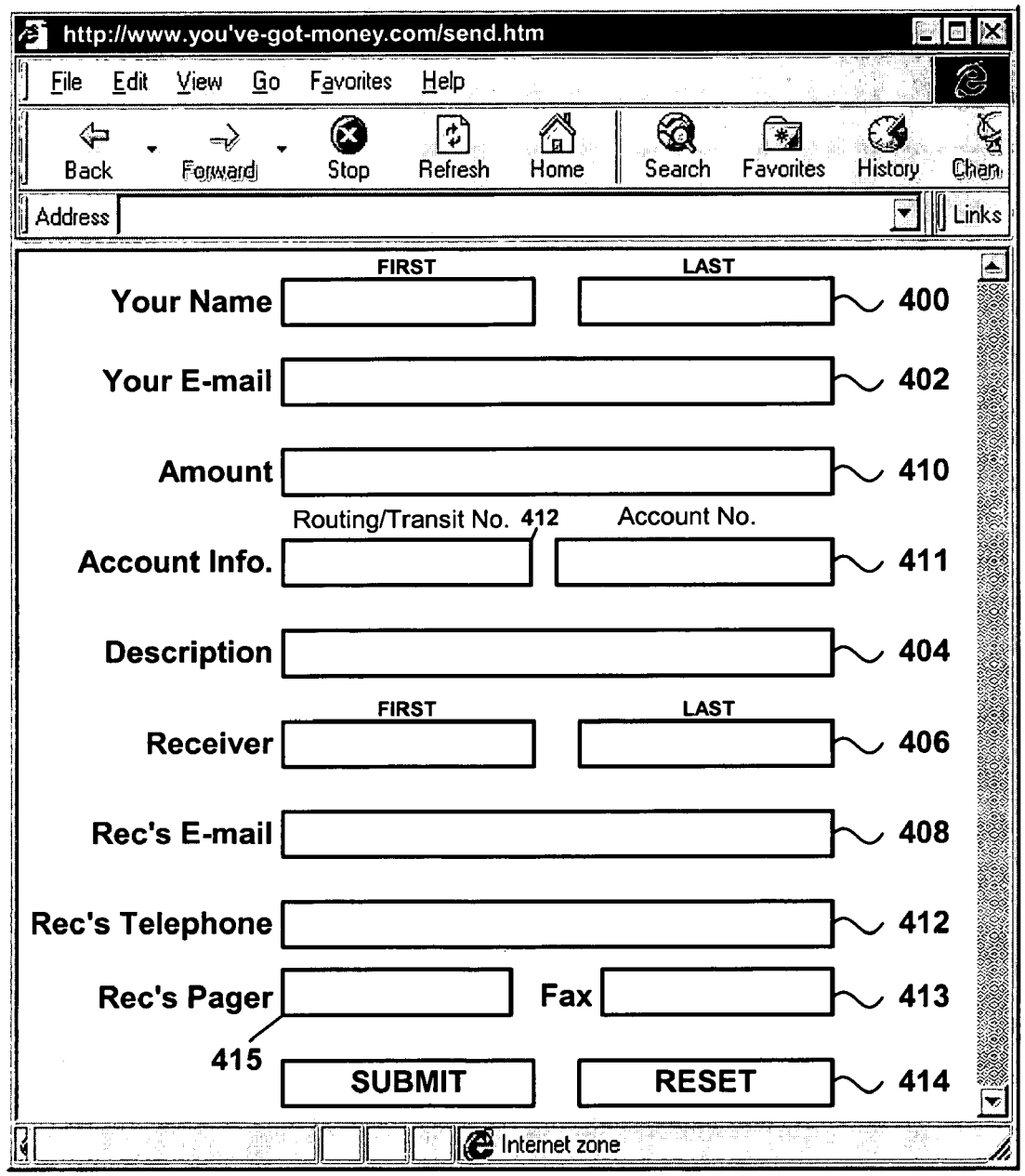
FIG. 4 is an illustration of a web page for sending funds.

The various embodiments of this step include any of the following 1(a)-1(d):

1(a). Communication between the sender and the host system 100 is provided by the host web site 114. The host web site 114 includes a page with form entry fields for capturing the sender's name, source account information, transfer amount, and receiver contact information. FIG. 4 illustrates an example of such a web page. Here, the sender inputs his name 400, email address 402, the source routing/transit 412 and source account number 411, transfer amount 410, the receiver's name 406 and email address 408, an optional description 404, and an optional receiver's telephone number 412. Optionally, there may be fields to capture the receiver's facsimile number 413 or pager number 415. The submit button 414 initiates the transfer via a conventional form action or other known means. As is known in the art, field validation may be performed via client side and/or server side scripts.

1(b). Communication between the sender and the host system 100 is by email or other electronic communication. The sender sends an email to host system 100 that includes the above specified information. The email may be transmitted using a predefined format that specifies each of the fields and their data so that the host system 100 may use a parser to effectively parse the email to extract the sender, transfer, and receiver information. Such a parser is programmed with the format of the emails (e.g. field names, their order, size, and delimiters, and so forth), and uses the programmed format information to extract the details of the request from an incoming email.

1(c). Communication between the sender and the host system 100 is by telephone via the voice response unit 116. Here the sender calls the host system 100 (preferably on a toll free line) and responds to a series of computer-generated prompts to enter the sender, transfer, and receiver information. The information may be entered using either keypad entries (e.g., for account numbers and telephone numbers), by voice recognition (e.g., for sender and receiver names or email addresses), or a combination of both. Alternatively, the information may be obtained by a live customer service representative.

1(d). Communication between the sender and the host system 100 is by messaging from the sender's financial management application 128. In this embodiment, the financial management application 128 generates a transfer or payment instruction, obtaining stored information on the sender's accounts, and obtaining the transfer information and receiver information from the sender via a simple form interface. This information is transmitted to the host system 100 over a public communications network, such as the Internet, using standard financial data transfer protocols, such as OFX. The financial management application 128 also updates its accounts to show the appropriate debit entry.

2. The host system 100 provides a debit instruction to the host's financial institution 102, to collect the specified transfer amount from the sender's source account. The host system 100 further specifies the target account for the debit entry as the funds transfer service's account at the financial institution 102 (or other financial institution at which the funds transfer service maintains an account). The transfer of this instruction may be done piecemeal or in batches of instructions, preferably to allow the host financial institution 102 to take advantage of the closing time for immediate settlements under the ACH rules.

3. The funds transfer service's financial institution 102 transmits an ACH debit into the ACH network 104 specifying the transfer amount, the sender's source account routing and transit number, the sender's account number, and the service's routing/transit number and account number as the target account. The ACH entry is preferably transmitted as part of an ACH debit file or a cash consolidation file on behalf of the host system 100, in accordance with standard ACH protocols.

In a preferred embodiment, the host's financial institution batches the host system's instructions into the appropriate ACH file types, and transmits these batches to its ACH operator so as to obtain next day settlement (complete transmission by 3 a.m. ET). In this manner the host system's account is credited as soon as possible with the sender's funds.

4, 5 and 6. In these steps, the ACH network 104 determines the appropriate settlement amounts between various financial institutions including the sender's financial institution 106 and the host's financial institution 102, and communicates (4) with the sender's financial institution to request withdrawal (5) of the transfer amount from sender's account, and then forwards (6) the transfer amount as a credit to the funds transfer service's account at its financial institution 102.

It should be noted that the sender's financial institution 106 and the funds transfer service's financial institution 102 may be the same financial institution, or that the receiver's financial institution 108 and the funds transfer service's financial institution 102 may be same, or both. In these cases, the financial institution 102 effects the appropriate account transfers as "on us" entries, without going through the ACH network 104 per se. "On us" transactions should reduce or almost eliminate the credit risk since the transactions will not settle if there are insufficient funds. However, it does not impact the fraud risk.

7. The host system 100 communicates with its financial institution 102 periodically (e.g. after the previous day's settlements) to determine whether any senders' transfers have not been settled. By way of background, a financial institution is only notified of ACH entries that are rejected for one reason or another; if the financial institution does not receive such a negative notification it can assume (at least temporarily) that an entry has cleared. Accordingly, when the host system 100 contacts its financial institution 102 it receives information indicating which transfers have been rejected by sender's financial institution. The host system 100 updates its database 212 to update the status of these transfers to indicate their rejected state; other transfers are updated to indicate that they have cleared.

8. The host system 100 contacts the receiver to inform it that funds are being transferred to it, and to provide sufficient information for the receiver to contact the host system 100 to provide information as to the target account into which the funds are to be transferred. The host system 100 provides sufficient information to the receiver to allow it to specifically identify the funds transfer when subsequently contacting the host system 100, for example, by providing the previously assigned transaction ID.

This step may be performed asynchronously with steps 2-7, above. The point at which this operation occurs may be varied to reduce the amount of risk to which the funds transfer service is exposed. Maximum risk exposure arises when the host system 100 contacts the receiver prior to settlement (6) in which the funds are credited to the host system's account, typically 8:30 a.m. ET of the next business day, according to ACH rules. The funds transfer service may choose to delay contacting the receiver until after settlement. Even so, there remains a credit risk since the sender's financial institution 106 (as a receiving bank under the ACH) may return the ACH debit after settlement for insufficient funds or other reasons. This credit risk may be dealt with as further described below.

Figure 5:
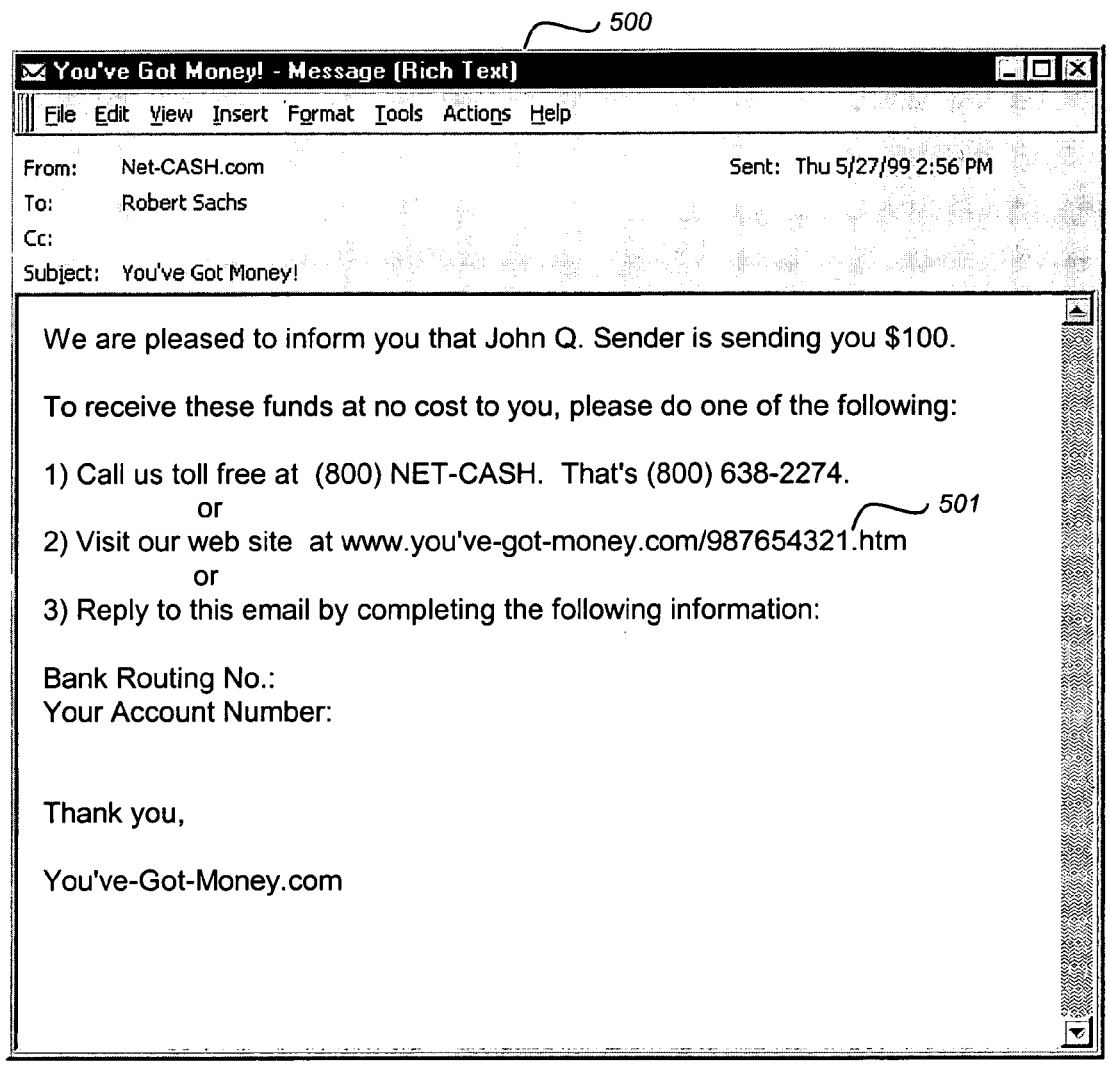
FIG. 5 is an illustration of an email informing a receiver of available funds.

The various embodiments of this step include:

8(a). The host system 100 generates and sends an email to the receiver at the provided email address. The email preferably identifies the sender by name and the amount of the funds being transferred, the transaction ID, and the sender's description of the transaction (optional). The email also lists one or means by which the receiver can contact the host system 100, including any of: a web site address (URL optionally including a transaction ID), a telephone number, or a reply email address. FIG. 5 illustrates a sample email 500 for this embodiment. Note that the reply URL 501 contains the recipient's transaction ID (e.g. 987654321), thereby allowing the recipient to immediately access the page containing the transfer information, without having to remember or retype the transaction ID information.

As an optional step in this operation, the email to the receiver may include an attached code element that updates the data files of the receiver's financial management application 128 as a deposit with the transfer amount, description, and so forth. Here, the code element encapsulates the transfer information (sender as payee, amount, date, and so forth) in a standards compliant data format, such as the OFX standard. Alternatively, the financial management application 128 receives a URL with the encoded transaction ID; this allows the financial management application 128 to directly contact the host system 100 and access a specific page with the receiver's transfer information, and directly download the transfer information and create a new deposit entry.

8(b). The host system 100 telephones the receiver at the provided telephone number(s) via the voice response unit 116 as appropriate. Preferably, the host system 100 uses computer-generated messages to inform the receiver of the sender identity, transfer amount, and to provide information for the receiver to contact the host system 100. Suitable computer message generation system are provided by Quality Call Solutions, Inc., and Periphonics, Inc. The host system 100 may detect that the telephone number is for a pager of the receiver (or this may be initially specified by the sender), in which case the host system 100 generates the appropriate numeric or alphanumeric page on the receiver's pager (e.g. leaving either a call back number, or a text page with appropriate text information). If multiple telephone numbers are provided for the receiver, the host system 100 may call each of them in turn, with the appropriate amounts of delay. The host system 100 may also generate a facsimile and transmit this to receiver if the sender has provided a facsimile number.

The host system 100 may use either or both of these embodiments 8(a) and 8(b).

9. The receiver contacts the host system 100 and provides information to designate the desired target account into which the sender's funds are to be transferred. In the first embodiment where the target account is a bank account, this information is the routing and transit number of the receiver's account and the receiver's own account number.

Figure 6:
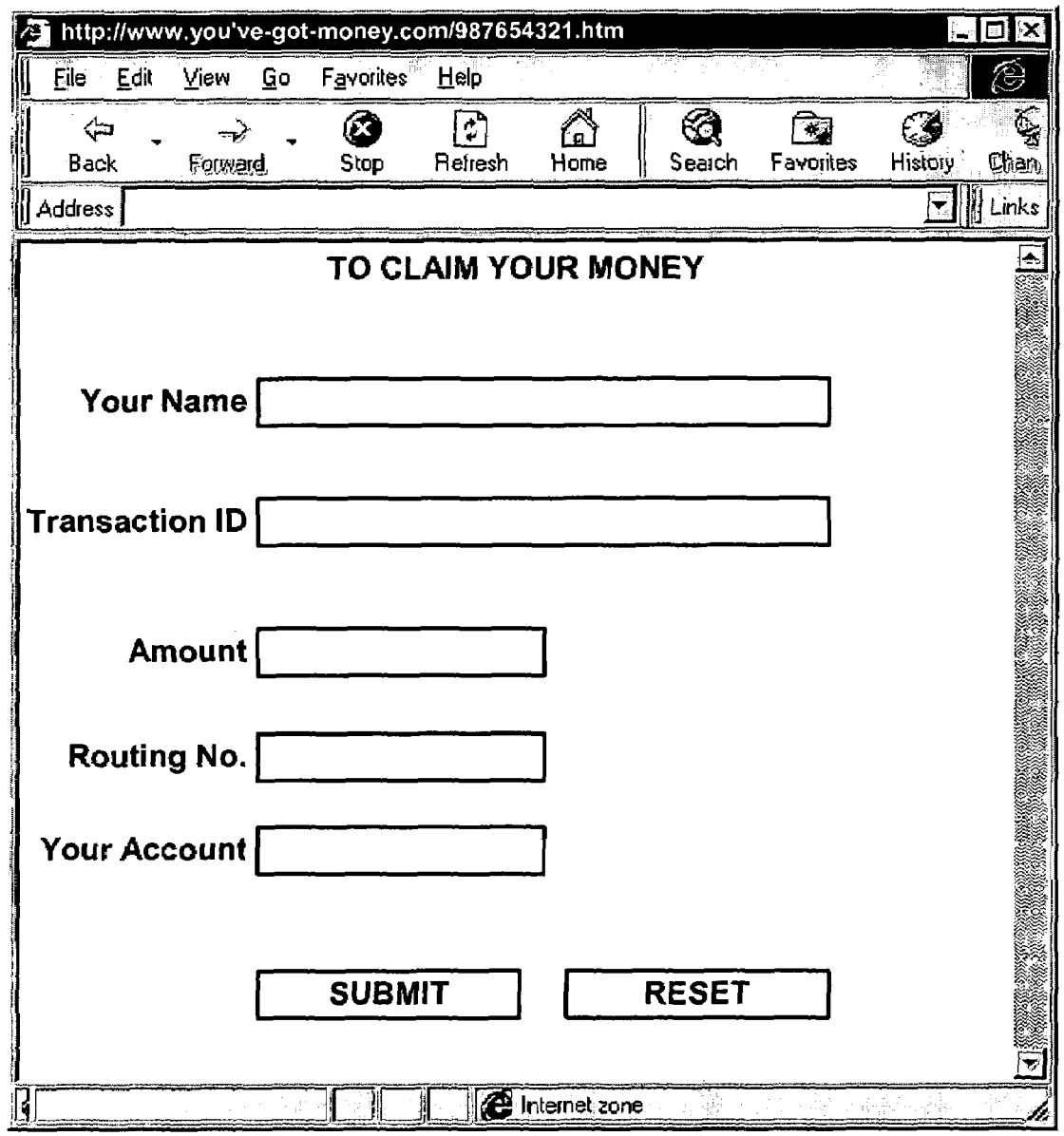
FIG. 6 is an illustration of a web page for claiming funds.

The embodiments of this step include any of the following 9(a)-9(b):

9(a). The receiver visits the host system web site 114 using its computer 112 and a web browser 126. The web site 114 presents a form which requests the receiver's name, the target account information, such as the routing/transit number and account number; the form may optionally request a transaction ID (if otherwise not automatically provided), and the amount of the funds transfer for further verification, or may display this information ahead of time. The receiver's name and email address, and/or the transaction ID, may be used by the host system 100 to match the receiver's information with the stored transaction. FIG. 6 illustrates a sample web page of the host web site 114 for collecting such information.

9(b). The receiver provides the requested target account information, transaction ID, and so forth to the host system 100 via the voice response system. The information can be provided to a live customer service representative, to computer-generated message prompts via the voice response unit 116, or a combination of both, as desired for convenience, security, and ease of use. This step may occur during step 8(b) when the host system contracts the receiver.

9(c). The receive provides the requested target account information, transaction ID, and so forth by email from the email application 124 on its computer.

10. With the receiver's target account information, the host system 100 provides a second payment instruction to its financial institution 102, instructing it to credit the receiver's account the transfer amount using funds transfer service's account as the source account.

11. The host's financial institution 102 effects an ACH credit, specifying the source account as the funds transfer service's account, the transfer amount, and the target account as the receiver's target account information. Again, this ACH entry may be batched as appropriate into debit files or cash consolidation files, and transmitted to optimize settlement times. Again, if this transaction is an 'on us' transaction, it may be effected by the financial institution without the ACH network 104 (thus, step 13 would follow directly).

12. The ACH network 104 determines the appropriate settlements and transfers the transfer amount to the receiver's bank account at its financial institution 108. (The host system 100 is apprised of the settlements during its next update at step 7, above.)

13. The host system 100 communicates with the receiver that the transfer amount (or alternatively, transfer instruction) has been successfully delivered to the receiver's target account. This step may be done by email 13(a), by telephone 13(b), an update to its web site 13(c), or by other electronic communication channels.

14. The host system 100 optionally communicates with the sender that the transfer amount has been successfully delivered to the receiver's target account. This step may be done by email 14(a), by telephone 14(b), by updating a status page on its web site 14(c) or by other electronic communication channels.

It can be seen that the foregoing process flow, its in general form and its various embodiments, provides an efficient and convenient mechanism for senders to electronically transfer funds to receivers without the conventional burdens of wire transfers or ACH originator requirements.

IV. Transferring Money Between an Unregistered Sender and a Registered Business

The above process is typically effected by a sender when the receiver is not registered with the host system 100, such as friend or relative of the sender, or small business to which the sender is making payment on an entry. In another embodiment of the present invention, the receiver is registered with the host system 100, in that the host system 100 stores in its database 212 information about the target account(s) of the receiver and/or contact information about how to contact the receiver. This frees the sender from having to provide the contact information about the receiver, and further frees the receiver from having to provide its target account information to the host system 100 when a transfer is requested by the sender. This makes it possible for the host system 100 to more expediently cause the funds transfer to the receiver's account, in some cases without further participation by the receiver.

For example, this embodiment is useful for a sender making a payment to a business receiver (such as utility company, tax authority, credit card company, department store, and the like) that may provide business accounts for many different individuals and which regularly receives payments from such individuals. Here, the business receiver has registered and provided the host system 100 information about its target account(s) into which it wants payments (funds transfers) directed. The host system 100 need not directly contact the receiver as in the above process flow in order to obtain the target information.

Figure 7:
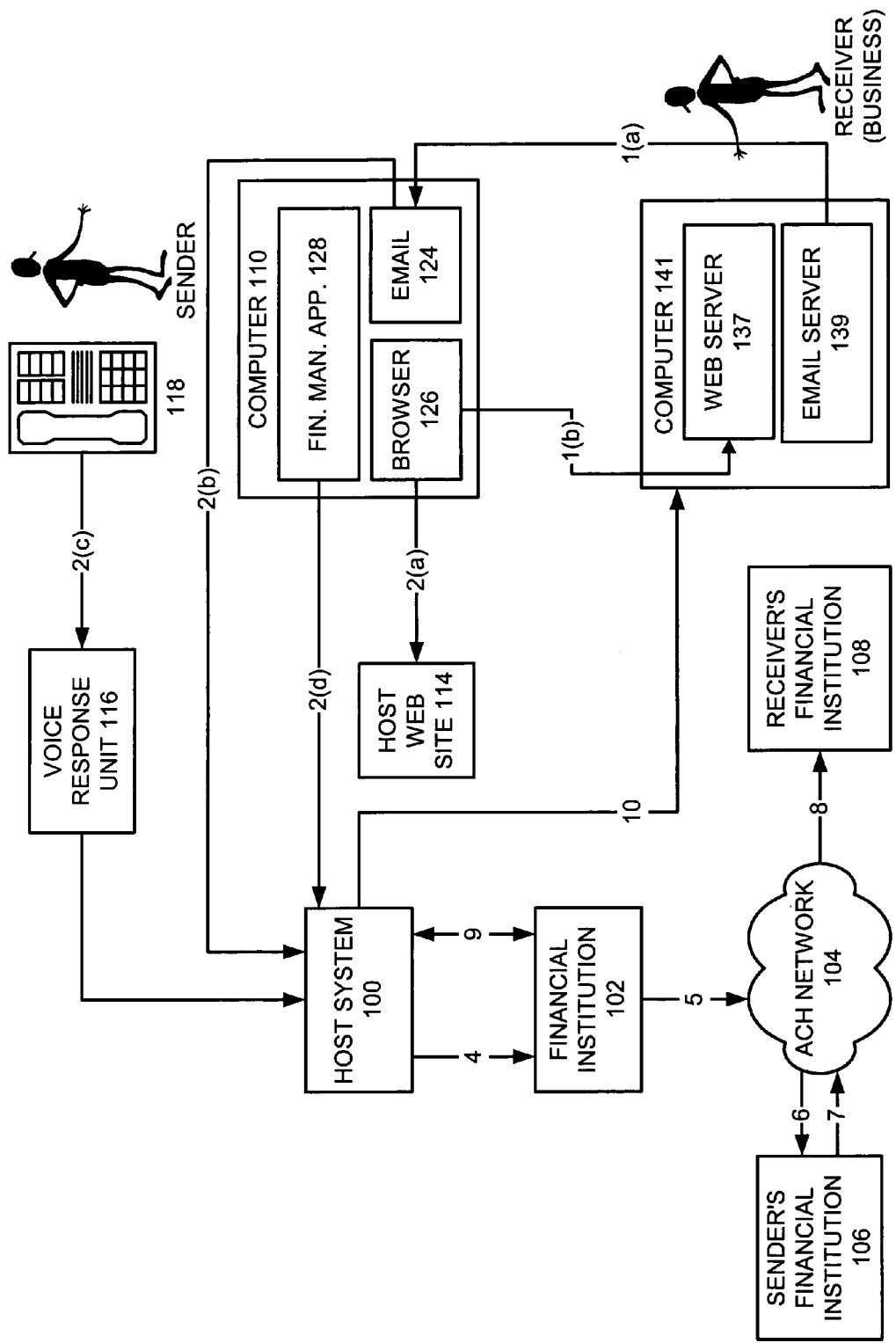
FIG. 7 is a flow diagram of the process of transferring funds to a registered receiver.

This process flow is discussed with regard to FIG. 7. The behavior of the host system 100 is managed by is request/response processor 210.

1. In an optional first step, a bill or other invoice is generated for a sender's business account with the entity or business receiver. This invoice may be transmitted in any manner to the sender. Preferably the invoice is transmitted by some form of electronic bill presentment, such as by email 1(a) (including sending a URL to the bill on the business's web server 137) or by the sender visiting 1(b) a web site of the business supported on its web server 137 and viewing the bill on such web site, or the like. In one embodiment, the funds transfer service acts as an intermediary, and receives the billing information for delivery to the sender as part of a payment service. Here, the funds transfer service may provide bill presentment of the bill on its web site 114.

2. If the bill is presented electronically, then the sender is preferably presented with an icon or link that the sender can activate to initiate the payment process. This process includes contacting the host system 100 and providing the sender's account information for the source account, the identity of the business receiver to receive the payment, the amount of payment, and (optional) payment routing information to ensure that the business receiver can properly match the payment to the bill or business account of the sender. The payment routing information may be either the sender's account number with the business or simply an invoice or bill number, or any other information used by the business receiver to match a payment to a sender's business account. The invoice or bill number is particularly useful if the sender does not maintain a business account with the business.

The embodiments of this operation include any of 2(c)-2(d):

2(a). Communication with the host is by access to the host web site 114, which presents a form to the sender to complete to provide the above information. Contact information other than the identity of the business receiving the payment is not required. The web site 114 may be accessed in response to the icon or link presented in the bill, or by simple direct access.

2(b). Communication with the host may be by email, as generally described above. Again, contact information other than the identity of the business receiving the payment is not required.

2(c). Communication with the host is by telephone via voice response unit 116, as described above.

2(d). Communication with the host system 100 is by messaging from the sender's financial management application 128, as described above. In this embodiment, the sender creates a payment instruction, again identifying the business receiver and the transfer amount. This is transferred to the host system 100 as above.

3. The host system 100 identifies the business receiver from the sender's communication, and looks up from its database 212 the target account information for this business. This information was previously stored by the host system 100 during a registration process.

4. The host system 100 provides two payment instructions to the host's financial institution 102. One instruction is a debit instruction to collect the specified transfer amount from the sender's source account. The host system 100 specifies the target account for this debit entry as its account at the financial institution 102. The second instruction is a credit instruction for the same amount to the business's target account, as determined from its database 212.

The transfer of these instructions may be done piecemeal or in batches of instructions, preferably to allow the host financial institution 102 to take advantage of the closing time for immediate settlements under the ACH rules.

The transfer of both the debit and credit instructions for a given payment, and the subsequent ACH transactions by the host system's financial institution 102 need not occur at the same time. In some embodiments it is preferable to execute the debit instruction independently of the credit instruction, for example to allow the debit to clear, or to instigate fraud control measures, as further described below.

5. The host system's financial institution 102 transmits the ACH debit into the ACH system 104 for the transfer amount, providing the sender's account number as the source account, and the host system's account number as the target account. The financial institution 104 further transmits the ACH credit, specifying the funds transfer service's account as the source, and business's account at its financial institution 108 as the target. Again, either or both the instructions may be executed as 'on us' transactions by the financial institution 102.

6-8. Settlement of the ACH instructions includes the ACH network requesting (6) the debit (7) to the sender's account at its financial institution 106, and the credit (8) to the business' target account at its financial institution 108. In practice, there may be intermediate credits and debits to the host's account at its financial institution 102 for the payment amount, but these transactions cancel each other out.

9. The host system 100 communicates with its financial institution 102 periodically (e.g. after the previous day's settlements) to determine which senders' transfers have been settled and to update its database 212 to indicate the settled state of the funds transfer.

10. The host system 100 contacts the business receiver that received the payment, and informs it of this fact, along with the business account number of the sender or invoice number, and the amount of the payment for that account/invoice. This communication is preferably electronic, such as by email, by direct modem connection, by FTP, or by any other electronic communication facility, or the like.

In practice, this step may be batched into an OFX file and repeated periodically, e.g. each morning, so that the communication lists many business account numbers or invoice numbers, and the payment made on each. This information is particularly useful for the business to properly update its records to reflect which of its customers have made payment to which business accounts or invoices. This feature solves the problem that many businesses have of correlating incoming payments to specific business accounts or invoices. Conventionally, the identity of the sender, the amount of payment, and the sender's account information are all present together, for example, when the sender pays by check and writes his account number/invoice number on the check or includes a payment stub.

However, in the present invention the payment funds are deposited directly to the business' financial account, and so the conventional mechanism is not available (no checks or invoice payment stubs). Accordingly, external information, as provided by the host system 100, is beneficially used to provide the sender's business account number/invoice number and payment amount in order to properly credit the sender for the payment.

This process has various advantageous features. First, the businesses are registered with the host system 100 to store the information about their target accounts, and optionally information such as billing practices, organization and format of the account information provided to the business in (10). Registration and storage of this information allows for fast turnaround times on payments of the funds. Second, electronic payment of the bill saves the sender mailing costs associated with conventional mailing of bill payments. Further, because of the low cost of the underlying ACH transfers, this process may be made available by the funds transfer service at very low cost or even free to sender.

A final advantage is that this process puts the sender in control of the transfer of funds from his or her account, deciding if and when payment will be made. This contrasts with conventional pre-authorized periodic payments (e.g., health club memberships) in which the sender has pre-authorized a fixed payment to be debited from the source account each month. The problem with this conventional sender pre-authorization approach is that it is very difficult for the sender to stop payments once they are started; banks often make several payments even after a sender has attempted to stop payment, and the business can unscrupulously continue to instruct its financial institution to make the debits. The sender then has to attempt to obtain a refund from the business, often to no avail. Yet another advantage is that the sender's confidential account information is never provided to the business receiver, and thus the business receiver can never on its own improperly obtain funds from the sender's source account.

An even more significant problem with the conventional pre-authorization approach that is overcome by the present invention is that most people want to be in control before their money is sent. They do not want money to leave their account unless they authorize the transaction. The present invention allows senders to avoid the embarrassment and avoid the high penalties that banks charge for overdrafts that can occur from pre-authorized transfers. Further, the present invention allows senders to take advantage of those bills that may be paid in part, by varying the amount of the balance due they wish to pay from month to month, such as credit cards.

Various alternate embodiments of this process may be practiced.

First, instead of the host system 100 instructing the funds transfer service's financial institution 102 to execute the two ACH entries, the host system 100 may send an email or other electronic communication to the business indicating that the sender has authorized the business to debit the sender's account at the sender's financial institution 106. This communication would contain the sender's source account information as collected in step (2). The business would then instruct its financial institution 108 to perform a single ACH credit to its target account.

In another alternative embodiment, the host system 100 shields the sender's source account from access by the business receiver by two steps. First, the host system 100 performs the ACH entries to debit the sender's source account and credit the funds transfer service's source account for the funds transfer amount. The host system 100 then informs the business receiver with an amount of a funds transfer, the sender's business account number (or invoice number) and the funds transfer service's target account designation (or other account of the funds transfer service from which funds may be withdrawn). This allows the business receiver to instruct its own financial institution 108 to perform the ACH entries to transfer funds from the funds transfer service's account to the business's target account, and further allows the business to credit the sender for payment of the bill. In this embodiment, the sender's account information is never disclosed to the business receiver.

In yet another alternative embodiment, the business sends (1) the bill to the host system 100, instead of to the sender. The host system 100 then presents the bill to the sender, preferably by email or by a posting on its web site 114, or directly to the sender's financial management application 128. The sender (preferably unregistered) transmits (2) its source account information to the host system 100 as before, and the host system 100 executes the first ACH debit to obtain payment. The host system 100 identifies (3) and informs (10) the business receiver of the payment by the sender, and the business contacts the host system 100 to request payment. The host system 100 then executes the ACH credit to the business' target accounts.

The foregoing process descriptions have discussed the operation of the present invention with respect to multiple different embodiments that involve different system components for communicating with senders and receivers, such as the voice response unit 116, the web site 114, the email server 206, and so forth. Particular embodiments of the present invention need not have all of these features. For example, one embodiment may use only the web site 114 as the mechanism for receiving sender requests for funds transfers and receiver information, along with contacting the receiver only by email. This embodiment would not use the voice response unit 116.

The efficiency of this above process, including its ability to be entirely automated, and its use of the ACH, results in a very low operating cost to the funds transfer service. As a result, the funds transfer service may charge very low service fees to senders, significantly lower than conventional wire transfer or retail transfer fees. Alternatively, the funds transfer service may provide its services entirely for free to senders and receivers, and obtain revenue from other sources, such as advertising revenue from advertisements placed on the host web site 114.

V. Handling Risk

The above processes operate without making explicit provision for dealing with the possibility of fraudulent or risky transactions. However, in practice senders and receivers may attempt to defraud the funds transfer service, including attempting to obtain funds that without providing payment, attempting to intercepting funds to others, and the like. In addition to fraud, there are various types of risk, as discussed above, including credit risk. The present invention encompasses methods for reducing various types of these risks.

A. Verifying Sender Identity

One type of fraud risk is presented by senders who may provide false source account information, giving either account numbers of non-existent accounts or the account numbers of others. Since the ACH network does not check to see if the sender's source account information matches the sender's identity (which is why banks typically require written authorization ahead of time from individual senders to recurrent ACH transactions), the host system 100 must proactively take steps to ensure that a sender provides a source account from which he or she is allowed to transfer funds.

1) Identity Verification Using Current Source Account Activity Information

In one embodiment, the present invention reduces this type of risk by requiring the sender to provide current specific activity information about the source account to the host system, which activity information is derived from transactions made in the source account. This source account activity information is of a type and nature that only the legitimate owner or user of the source account would know. This source account activity information is compared with similar information obtained from one or more online systems having authorized access to the source account. If the comparison of information is successful, the identity of the sender is confirmed and the transfer proceeds; if the comparison is negative, then the funds transfer is canceled, or the sender is given an opportunity to change the source account information. The activity information is preferably based on recent transactions, such as those occurring within the last several banking days.

In one version of this method, the account activity information is a current balance of the source account. The sender provides this activity information to the host system 100, which then compares this current balance with a current balance obtained by communication with one or more automated and online information sources. If the balances match, then the host system 100 has a high degree of confidence that the sender is authorized to transfer funds from the source account. In another version of this method, the account activity information is some number of recently written checks, including check numbers and amounts; or it may be some number of recent ATM withdrawals, point of sale purchases, and their amounts and/or dates. The account activity information may be provided to the host system 100 via its web site 114, preferably from a form designed to capture this information at the time the sender requests the funds transfer.

Figure 8:
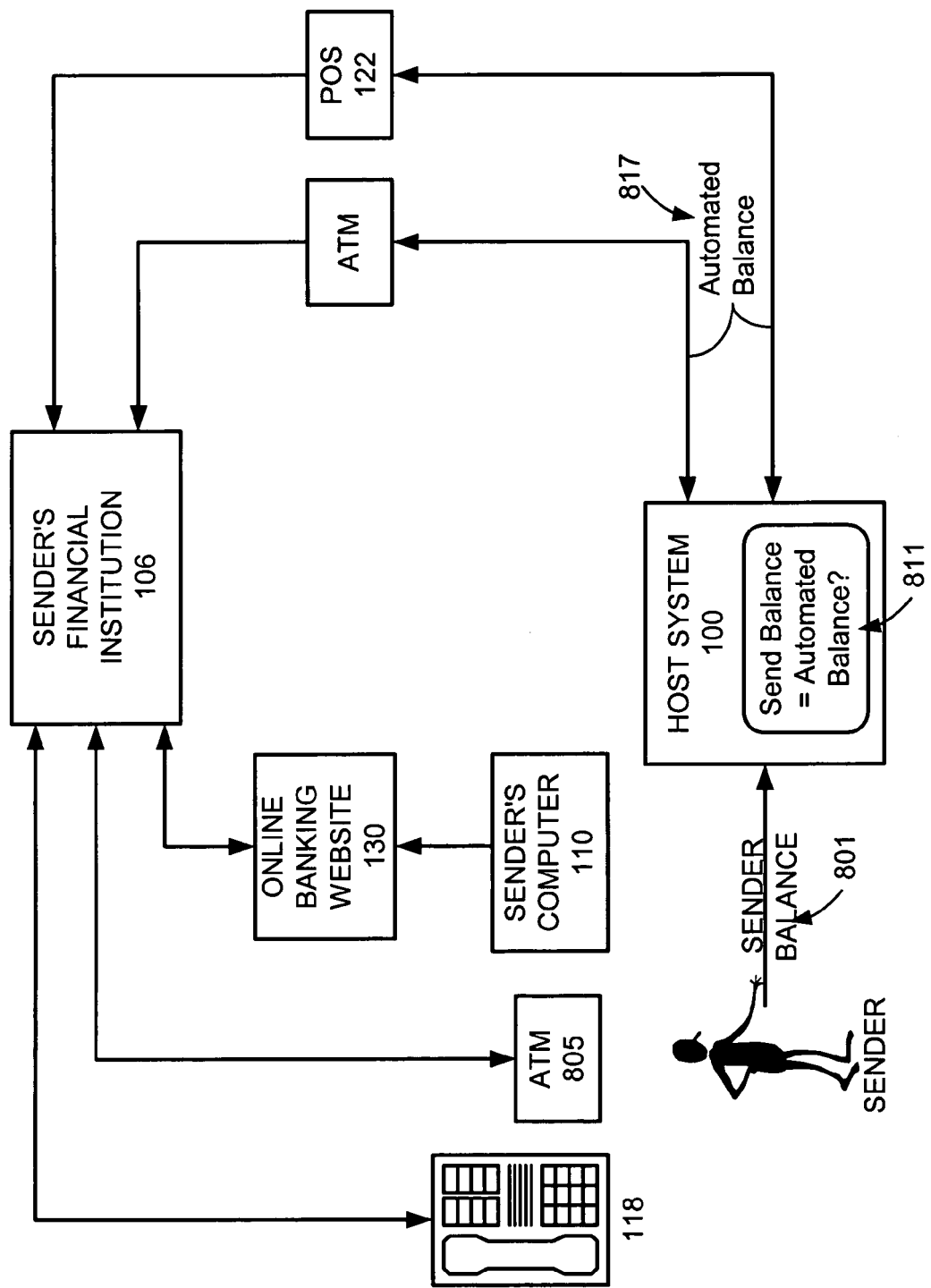
FIG. 8 is an illustration of one process of authenticating a sender by comparing account balances from different sources.

In one embodiment, the present invention here uses the Point of Sale system 122 to obtain the source account balance. This embodiment is illustrated in FIG. 8 (the following reference numbers in parentheses refer to process steps in FIGS. 3 and 7). The first time (or each time) a sender contacts (1) the host system 100, the sender provides 801a current account balance for the source account. This information is normally available only to an authorized account holder either from an automated teller machine 805, an online banking product 130, or by telephone 809. The balance from one of these sources will be the closing balance from the previous day for the source account, and may or may not reflect withdrawals and POS transactions made since the last time the source account was updated (e.g. transactions made over a weekend or holiday but not posted until the following banking day). Thus, the sender may be asked to further provide the amounts of any POS or ATM transactions made since the last time the source account was updated; or the sender may simply be asked to adjust the current balance to account for such POS and/or ATM transactions. In one embodiment, the host system 100 determines the date of the last update to the source account and prompts for POS and ATM transactions since that date.

If necessary—depending on the input provided by the sender—the host system 100 preferably adjusts the sender's input balance by amount of the additional POS or ATM transactions. The host system 100 then queries the POS system 122 using the sender's source account information to obtain an automated current balance 803 for the source account. The host system 100 compares 811 the automated current balance 803 with the sender's current balance 801. If the balances match, then the host system 100 proceeds to process with the funds transfer, as above. In one embodiment, the host system 100 does not require the two balances to be exactly equal; instead if the balances are within a predetermined error or tolerance value (e.g. $1.00 or $5.00), then the balances are deemed to match, and the funds transfer continues.

This approach effectively reduces fraudulent transactions since a malfeasant sender is unlikely to have access to the account balance of another person. The existing ATM, POS, online banking, and telephone banking systems provide in themselves various safeguards to prevent unauthorized access (e.g. PINs and identity verification), which the present invention utilizes to its own advantage. Further, the account balance information is something that tends to change frequently, thus even if a malfeasant sender obtained an old ATM receipt from a third party which showed the third party's account balance, without access to the current day's balance, the malfeasant sender would be unable to illegitimately transfer funds the third party's account.

Other embodiments of this approach still use the account balance of the sender to confirm authorization, but obtain that account balance information from sources other than the POS. In one embodiment, the sender inputs his ATM card number 805, PIN, along with the current account balance 801. The host system 100 uses the ATM card number and PIN to access the sender's account balance via the ATM network. The input of the ATM card number and PIN may be captured by telephone, or via a form on the host's web site 114, along with the account balance 801, when the sender visits the host system web site 114. In a different embodiment, the sender's computer 110 is coupled to a magnetic stripe reader that can read a standard ATM card, such as a Mag-Tek Wedge Magnetic Stripe Reader. Upon reading the ATM card, and entry of the sender's PIN, the sender's computer 110 transmits this ATM card number and PIN to the host system, and the host system 100 queries 817 the ATM network to obtain the source account balance.

Figure 9:
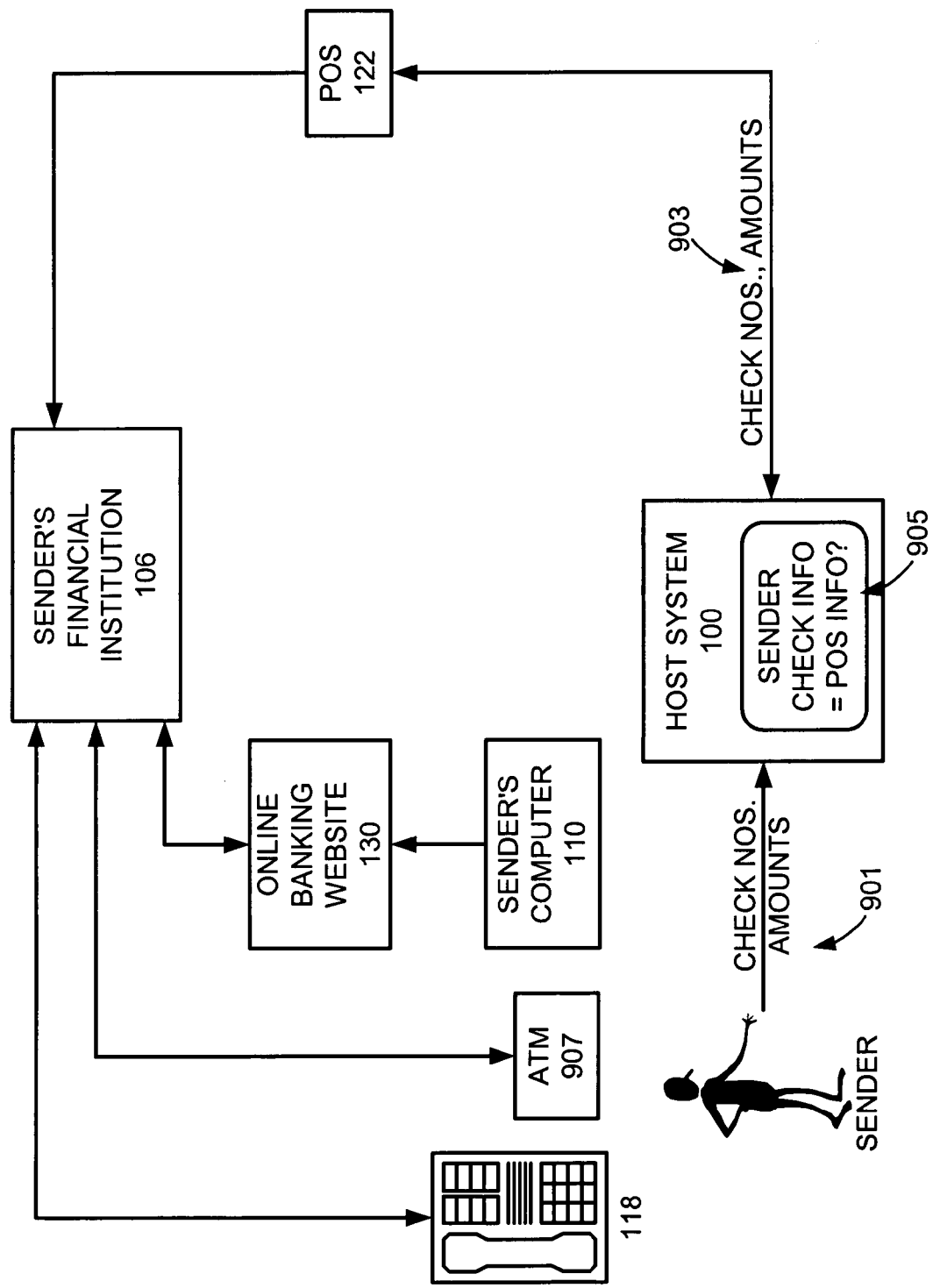
FIG. 9 is an illustration of another process of authenticating a sender by verifying check amounts.

Another embodiment of using current account activity information for determining the sender's authorization is illustrated in FIG. 9. This embodiment may be used instead of, or with, the previous method based on the account balance. In this process, which preferably occurs during step 1 of FIG. 3 or step 2 of FIG. 7 (but may be effected at other times as desired), the sender provides 901 the host system 100 with the last one or more check numbers and amounts that the sender has drawn on the source account. The information is obtained by the sender, for example, from an ATM machine 907, by telephone 118, or from the financial institution's website 130 via the sender's computer 110. The host system 100 queries 903 the POS 122 (which provides information on up to the last ten checks) for the amount(s) of the specified check number(s). The host system 100 then compares 905 these amounts to confirm that the sender's input information matches the POS information. Again, if a match is made, then the funds transfer proceeds as above. A match may be required on all the requested check numbers or on a majority or other threshold.

The information about check numbers and amounts may be input into the host system 100 through any of the communication mechanisms, including via a form on the web site 114, by email, or by directly sending this information from the sender's financial management application 128.

This embodiment is also effective because again a malfeasant sender is unlikely to know the last check numbers and amounts of third party's account.

2) Identity Verification Using Access to Accounts of the Sender

Yet another method by which the sender's identity may be authenticated is by access to personal online accounts held by the sender. One embodiment of this approach relies upon online access to the sender's financial institution and the sender's financial accounts: The sender provides the host system 100 with a user name and password for access to the sender's financial institution 106, for example, as would be used for online access via the online banking web site 130. The host system 100 then uses this name and password to attempt to access the sender's accounts via an online mechanism, such as the financial institution's web site 130. The host system 100 can detect whether the access attempt is successful or not, either by parsing the returned web pages, or by analysis of the returned URLs or other responses from the financial institution web site 130. If the attempt is successful, then sender's provided information is correct, and the sender has been authenticated. The host system 100 can then continue with the funds transfer. If the attempt is unsuccessful, then the host system 100 terminates the funds transfer. This authentication method may be implemented during step 1 of FIG. 3 or step 2 of FIG. 7, alone or in conjunction with other described authentication methods.

This method may also be used to obtain current account activity information. Once the host system has accessed the sender's account via sender's financial institution web site 130, it can use parsing software to parse the returned pages and read the sender's account balance or other activity information. This activity information is then compared with the activity information input by the sender, as described above. Suitable parsing software and tools for accessing online accounts, may be obtained, for example, from Yodlee.com.

Authentication by access to online accounts may be implemented to access other types of personal online accounts held by the sender. For example, many senders maintain purchasing accounts on various online retailers such as Amazon.com, and the like. These purchasing accounts typically store the sender's name, address information for shipment, credit card information, and the like, and are protected by a user name and password. The account information is likely highly reliable because the online retailer is relying upon it to complete transactions and ship goods to the sender. The types of online accounts that may be used for this approach include, but are not limited to, purchasing accounts at online retailers, brokerage accounts, personal home pages on portal sites (e.g. MyYahoo at Yahoo.com), or any other type of notional account which requires a user name and password to access.

Accordingly, in one embodiment, sender provides to the host system the name or URL of a web site at which the sender maintains an online account, along with the sender's user name and password. This information may be received in an appropriate web page form on the host system's web site 114. The host system 100 accesses the online account at the appropriate URL, and inputs the sender's user name and password to access the sender's account information. If the attempt is successful, the sender's identity is authenticated, and the funds transfer proceeds.

As can be appreciated, these personal accounts are not established for the purpose of authenticating the sender to other systems or services; instead they are established by the sender for conducting transactions or storing information with some third party's online system directly (e.g. for purchasing goods at the online retailer's web site). However, the present invention makes beneficial use of the existence of these accounts and their ability to be accessed online directly at the time the sender requests the funds transfer in order to authenticate the sender. This approach does not appear to have analogues in conventional "in-person" transactions. For example, a person signing up in person or over the telephone with a business (e.g. to send a retail wire transfer, open a credit account, establish utility service) would not give his username and PIN for his bank accounts, or his user name and password for other personal online accounts to the business to authenticate himself.

A further feature of accessing personal online accounts of the sender is the ability to obtain historical information about transactions of the sender, such as purchases, investments, and so forth. This information may be used to perform credit analysis, report on the sender's payment history, or other types of financial analysis.

B. Verifying Sufficient Funds

A second, and potentially more prevalent risk is that of insufficient funds in the sender's source account. Here, the risk is that the sender can authorize the initial funds transfer, which will result in a debit to the source account. On settlement day, the sender's financial institution 106 will determine that the source account had insufficient funds. The sender's financial institution 106 will automatically request and obtain the transfer amount back; this is an ACH return entry. This happens with either insufficient funds or false account numbers. If the return is requested, then the sender's financial institution 106 automatically obtains the funds back from the host system's financial institution 102, and thus the host has suffered a loss of the transfer amount if it may have already paid the receiver. The host system 100 is not allowed by ACH rules to request the transfer funds back from the receiver. This risk is increased if there is sender-receiver collusion.

The present invention reduces this risk again by selective use of the POS 122. Generally, the principle is to check the source account balance after the transfer funds have been debited from it (e.g., the next business day), along with all debit entries processed on the source account from the previous business day. If the source account balance is greater than the transfer amount, then this indicates with high confidence that there were sufficient funds in the source account from which to withdraw the transfer funds. The host system 100 then proceeds with the funds transfer, such as contacting the receiver, and so forth.

Figure 10:
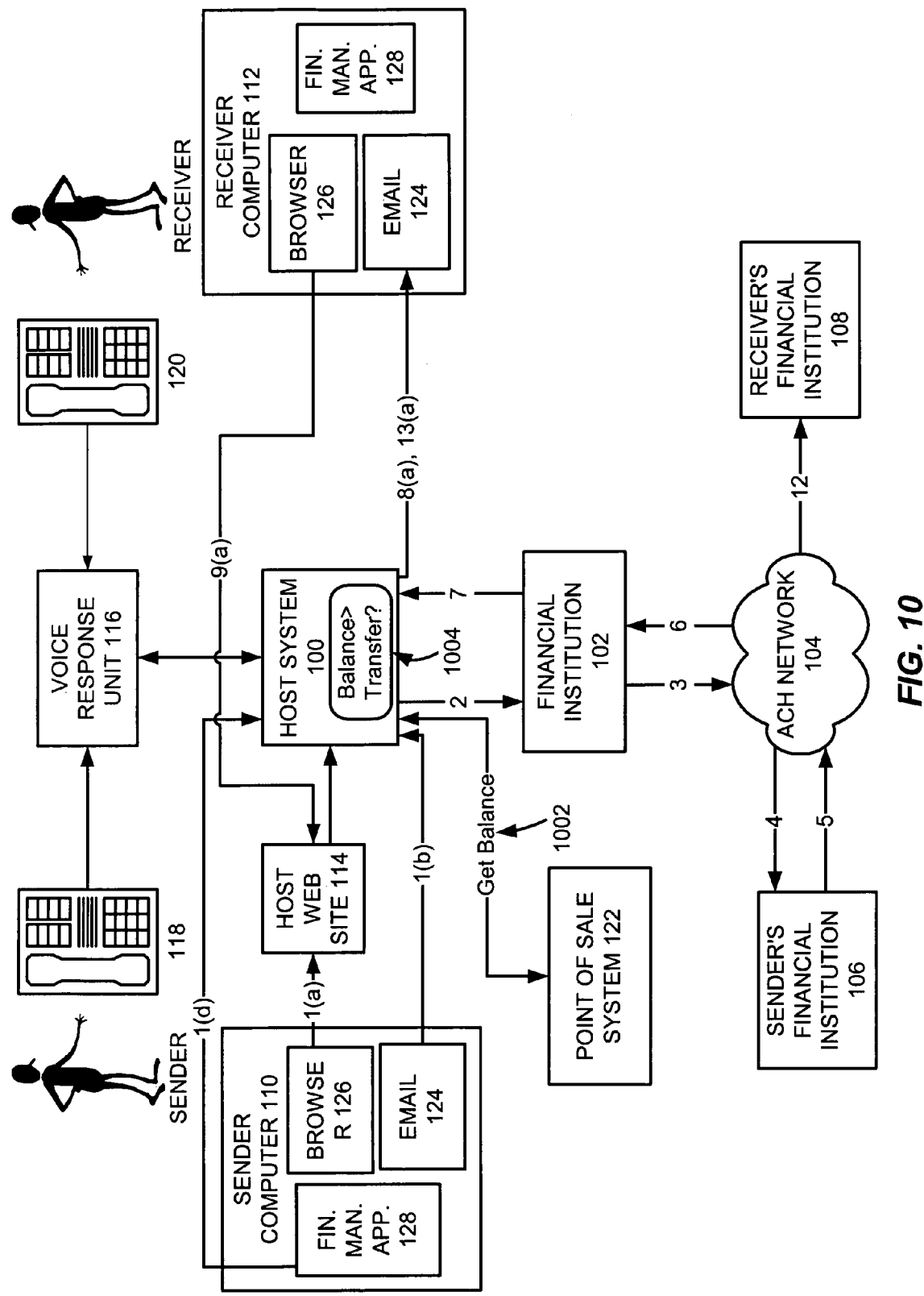
FIG. 10 is a process flow for verifying sufficient funds using the POS system.

FIG. 10 illustrates one embodiment of this approach. The initial steps 1-6 of the sender contacting the host system 100 requesting the funds transfer, and the host system 100 instructing its financial institution 102 to process the ACH debit and so forth are essentially the same as described above. However, after the ACH debit clears, the transfer funds are then held at the host system's financial institution 102. The next morning or thereafter the host system 100 queries 1002 the balance of the sender's source account using POS 122. The host system 100 compares 1004 the POS obtained balance with the transfer amount. If the balance is greater than the transfer amount, then the host system 100 proceeds with the funds transfer, either contacting (8) the receiver to indicate that funds are being transferred (as in FIG. 3), or automatically generating the ACH credit instruction for the transfer to the receiver's account (12), for example for payment to registered receiver such as a business (as in FIG. 7). If the balance is less than the transfer amount, the host system 100 can terminate the funds transfer, and inform the sender of the problem, or the host system 100 may continue with the funds transfer.

This method is useful to protect against insufficient funds and the attendant credit risk in about those transactions which are repudiated within one business day (currently about 95% of ACH entries).

In another embodiment there is provided another means of verifying sufficient funds. When the host system 100 contacts the receiver, it requests the receiver to consent to a later withdrawal of the transfer amount from the receiver's target financial account in the event that the sender's financial institution retracts the funds from the host system's account. This pre-authorization thus protects the financial transfer service in the event that there are insufficient funds in the sender's account, and allows those funds to be returned to the funds transfer service, because the funds transfer service is thus authorized to withdraw the funds back from the receiver. This pre-authorization is not to be confused with conventional pre-authorizations as discussed above, in which the sender (not the receiver) pre-authorizes the initial withdrawal of funds for a funds transfer. Rather, this pre-authorization is one that essentially undoes the funds transfer in its entirety, and thereby eliminates the provisional credit risk faced by the funds transfer service.

C. Unauthorized Receiver

A third source of risk is wherein an unauthorized party poses as the receiver and attempts to divert funds from the sender to its own account instead of to the intended receiver's account. For example, the interloper here would intercept the communication (8) from the host system 100 and provides its own target account numbers.

The present invention encompasses various methods of reducing this type of risk. In one method the sender and the receiver share a secret password which must be provided by the receiver to the host system 100 in order to effect the funds transfer to its target account. The sender may communicate this secret password to the receiver by any means, including email or telephone at any time prior to the receiver communicating with the host system 100 to provide the target account information.

A second method, applicable to where the receiver communicates with the host system 100 via the Internet or email, is the use of a digital certificate by the receiver which authenticates the receiver's email address or other identity information.

VI. Additional Refinements and Embodiments

A. Registration with Funds Transfer Service

In one optional embodiment, users, including either senders or receivers, register with the host system 100. During registration, a user provides appropriate contact information, and account information, including their financial account information and preferably business account information for intended business recipients. The user may also specify a plurality of financial accounts for either sending or receiving funds (and may designate certain accounts as send-only or receive-only).

A user may also provide a personal list of one or more individual receivers to whom future funds transfers are desired, including the names and contact information for such receivers. A user may optionally define a shared password or secret code for each receiver to be used by the receiver to verify their identity when they contact the host system 100. The host system 100 may cross check these lists against the names of registered users to create associations between the sender's data and the receivers' data.

The registration process may take place independently of any particular funds transfer, or during a particular funds transfer. For example, when an unregistered receiver provides his account information, they are preferably provided with an opportunity to register himself with the host system 100.

Registration is beneficial to both senders and receivers because it further streamlines the funds transfer processes. When the sender contacts the host system 100, the sender need only login (e.g. with a user provided user name and password), and then quickly select from their personal list of receivers, or enter a new receiver, and enter a transfer amount. If the sender has a list of available source accounts, the host system 100 prompts the sender to select from the list, otherwise the host system 100 automatically provides the source account selection. The login, prompting, and selecting may be done via the host web site 114, or by telephone via the voice response unit 116.

If the receiver is selected from the personal list, then the host system 100 can quickly locate the appropriate contact information from the sender's database entry, thereby further speeding the request process. Even if the receiver is not on the sender's personal list, the host system 100 may cross check the receiver's name with the database 212 to determine if the receiver has separately registered. If so, the host system 100 prompts the sender to confirm the host's identification of the receiver.

Registration is also beneficial to receivers. When the receiver contacts the host system 100, he may provide his login and password; again, the host system 100 looks up the receiver's account information and prompts the receiver to either select a target account from their list of accounts, or confirm the selection of the target account if only one is available.

While registration is beneficial, it is not mandatory. Indeed, the present invention is particularly beneficial when at least one of the sender or the receiver is not registered with the funds transfer service: in this situation the present invention is still fully capable of effecting a completely electronic funds transfer between the sender and receiver, a benefit currently unavailable to individuals and businesses.

B. Automatic Updating of Financial Management Application Files

In one embodiment of the various processes of FIGS. 3 and 10, when the host system 100 contacts the receiver by email 8(*a*), the host system 100 provides a data file or code element, such as a Java script, which updates the data files of the receiver's financial management application 128 with data for the funds transfer. In an alternative embodiment, when the receiver contacts the host system 100 via the host web site 114, and identifies itself for a particular funds transfer, the host system 100 downloads data files and/or code which updates the receiver's financial management application 128.

In yet another alternative embodiment where the receiver has an online banking relationship with its financial institution 108, and communicates with the financial institution 108 via its online banking web site 134, then this online banking web site 134 downloads data and/or code which updates the receiver's financial management application 128 to reflect the funds transfer. The financial institution 108 will have evidence of the transfer, since it previously executed the ACH credit to the receiver's account.

In all of these embodiments, the receiver benefits by having its financial management application 128 updated to reflect the funds received in their financial account at the financial institution 108.

C. Transfers Between an Individual's Accounts

One of the most common and yet unmet needs in today's financial services industry is the need for individuals to transfer funds between accounts at different financial institutions. An individual may have accounts with several banks, brokerage firms, credit unions, and the like. Other than either direct wire transfer (expensive) or deposit or cash or check (inconvenient and slow) there is no automated and inexpensive way for an individual to transfer funds between accounts at different financial institutions. The present invention however enables such an automated funds transfer.

Generally, a sender may specify himself or herself as the receiver of a funds transfer, selecting one of their accounts as a source account. The host system 100 recognizes that the sender and receiver are same and automatically prompts the sender to select a target account. When both accounts have been provided, the host system 100 effects the appropriate ACH entries, as described in FIG. 3. The host system 100 may employ the various measures against fraud and provisional credit risk as described above to prevent a sender from transferring funds that do not exist or belong to others.

D. Payments to Tax Authorities

Another embodiment of the present invention is the specific transfer of funds to tax authorities including local and state governments and to the federal government. Conventionally, direct deposit of income tax refunds is now available, however there is no program by which direct payment of taxes from a taxpayer/sender's accounts is possible.

In the context of the present invention, a tax authority would be one of the registered business users. The tax authority would provide appropriate target account information for receiving tax payments, which information would be stored in the database 212. When a sender wishes to make a tax payment, the sender provides the source account information, payment amount, along with information necessary for the tax authority to reconcile the tax payment with amounts owed, such as the sender's Social Security Number, tax payer identification number, property tax parcel number, and the like. The host system 100 may already maintain the target account information of the tax authority. The host system 100 then effects the tax payment as a funds transfer in accordance with the methods described above.

E. Online-Bill Presentment and Payment

In the discussion of FIG. 7, the presentment of a bill to the sender by a business or similar entity was described in step 1. More detailed variations of this embodiment are now described.

Online bill presentment is anticipated as a primary means by which bills will be presented from businesses to their customers in the future. Accordingly, the present invention accommodates this advance. A bill presented online may be transmitted either by email to a sender's computer 110 or may be presented when the sender visits the business's web server 137 and logs in to the server to obtain current account information. When an email is presented, it may contain the bill information itself and an icon, link or other URL enabled mechanism which initiates a funds transfer via the host system 100. When the bill is presented on the business's web site, again an icon, link, or other URL-enabled mechanism may be provided to initiate the funds transfer bill payment.

The URL would be encoded with appropriate information to identify the business' target account, the sender's business account (or invoice number) so that this is automatically provided to the host system 100 without requiring the sender to provide this information. The amount of the bill may also be encoded in the URL, or the sender may provide this at the appropriate time when prompted by the host system 100. The sender need only provide their source account information. Even this step may be bypassed if the sender is registered (or if such information is stored locally on the sender's computer 110 such as in cookies). Thus, the entire bill payment process may be streamlined in this fashion.

Figure 11:
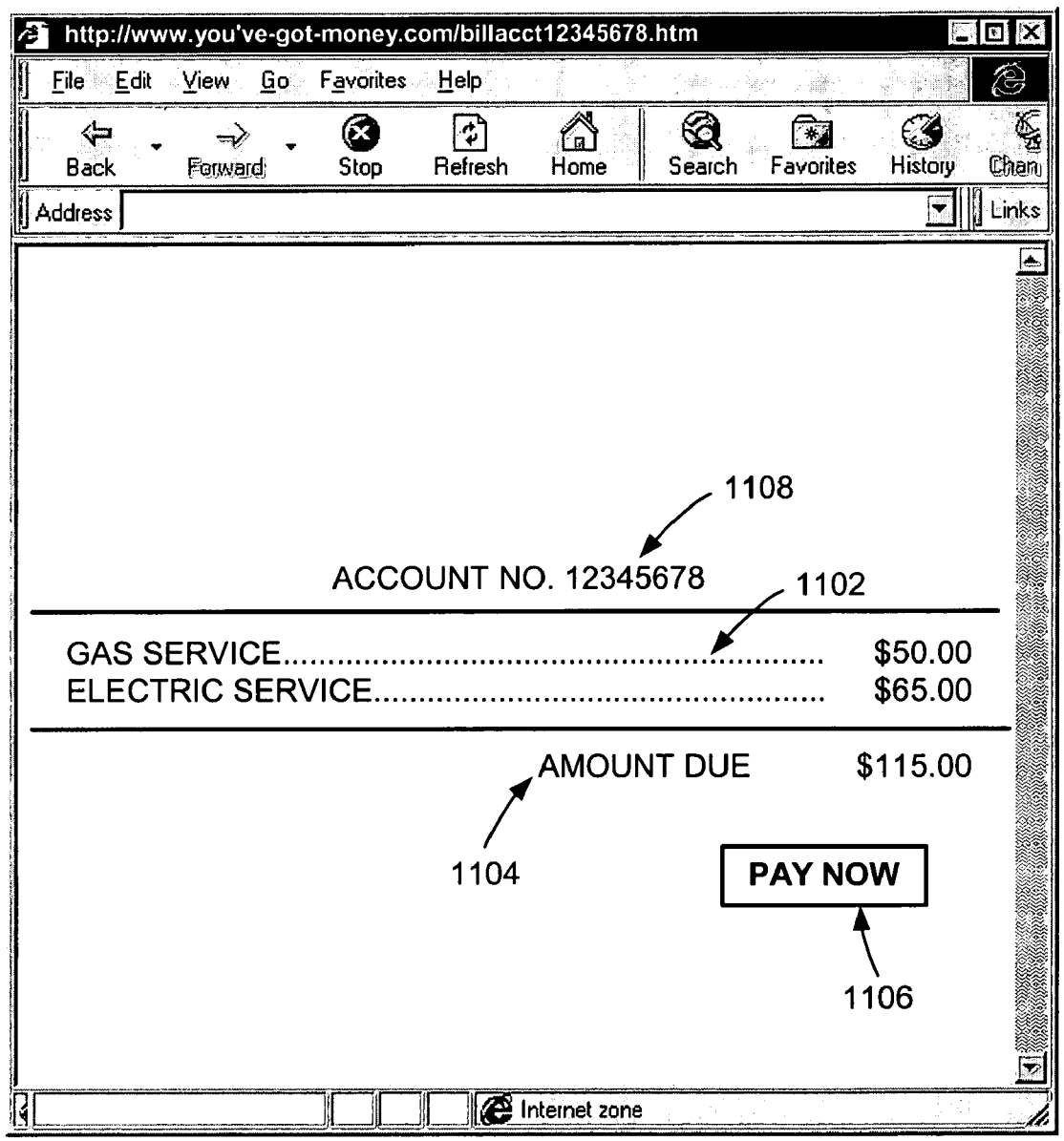
FIG. 11 is an illustration of an example web page for online bill presentment.

FIG. 11 illustrates this approach. Here, an online bill on a business's web site for a sender shows a various account activity 1102, a total amount to be paid 1104, and an icon 1106 for immediately paying the amount due. The sender's business account number 1108 is also shown. The icon 1106 is associated with a form action, which transmits to the host web site 114 the payment amount 1104, the sender's business account 1108, the business's target account information, and any other information useful to identify the funds transfer for later accounting and reconciliation. At the host web site 114, the sender provides their source account number. The host web site 114 in turn passes the data for the payment to the request processor 210. The request processor 210 initiates the sequence of events for transferring the funds from the sender's account to the business account, as described above with respect to FIG. 7.

It is anticipated that in one embodiment an individual business may operate in the capacity of the funds transfer service on its own behalf, and thus provide the host system 100 and web site 114 and so forth, such that it is always the receiver of funds transfers. This allows the business to provide online bill payment in accordance with the present invention.

F. Payment for Web Purchases

Yet another embodiment of the present invention is for payment of purchases from online shopping on the World Wide Web (or its successor or related incarnations in the future). Most online payments use either credit cards, some form of micropayment, or digital cash. Each of these has disadvantages.

The present invention can be disposed to provide a payment mechanism for such online shopping, operating in a manner similar to online bill presentment on a business's web site, as discussed above. When a purchaser is ready to conclude a purchase a page is shown with a similar icon 1106 or link or the like which generates a a request to the host web site 114 for initiating the funds transfer. As before the request includes the seller's target account information and the amount of the funds transfer. The sender (here the purchaser) also provides their source account information (which may be provided to the seller's web site, or to the host web site 114). The host system 100 effects the funds transfer as described above, since it now has sufficient account information from both the purchaser/sender and seller/receiver to cause its financial institution to effect the appropriate ACH entries. The seller may provide a business account number of the purchaser, or a transaction identifier to properly identify the payment with the host system 100. When the payment is cleared, the host system 100 may contact the seller, providing the transaction identifier or business account information to indicate that payment has been settled, allowing the seller to properly update its accounts to show completed payment of the purchase.

It is anticipated that businesses and sellers may register with the funds transfer service for the latter to provide payment processing for web-based purchases. Accordingly, the various features and benefits of registration, as discussed above, are also applicable in this embodiment. For example, with registration of a seller and its target account, the seller provides a seller identifier in its request, by which the host system 100 can look up the appropriate target account for the seller prior to instructing its financial institution 102 to effect the ACH entries.

Again, the business or seller providing the online shopping experience may operate in the capacity of the funds transfer service on its own behalf, and thus provide the host system 100 and web site 114 and so forth, such that it is always the receiver of payments as funds transfers.

G. Alternative Source and Target Accounts

The above aspects of the present invention have been described generally with respect to source accounts which are banking type accounts held by banks, savings and loans, credit unions, brokerage firms, and so forth. Target accounts have been similarly described.

In alternative embodiments other types of source accounts may be used or other types of target account may be used. Generally any type of pre-funded account may serve as the source of funds. Thus the sender may designate a credit card account, credit line, tax refund account or brokerage account, cash management account, savings account, money market fund, or the like.

When a party specifies a brokerage account as the source or target account, the party provides the routing/transit number of the brokerage's financial institution, the brokerage's deposit account number at this financial institution, and the party's own account number with the brokerage. This allows the host to properly instruct its financial institution 100 to obtain or direct the funds to or from the appropriate account.

Figure 12:
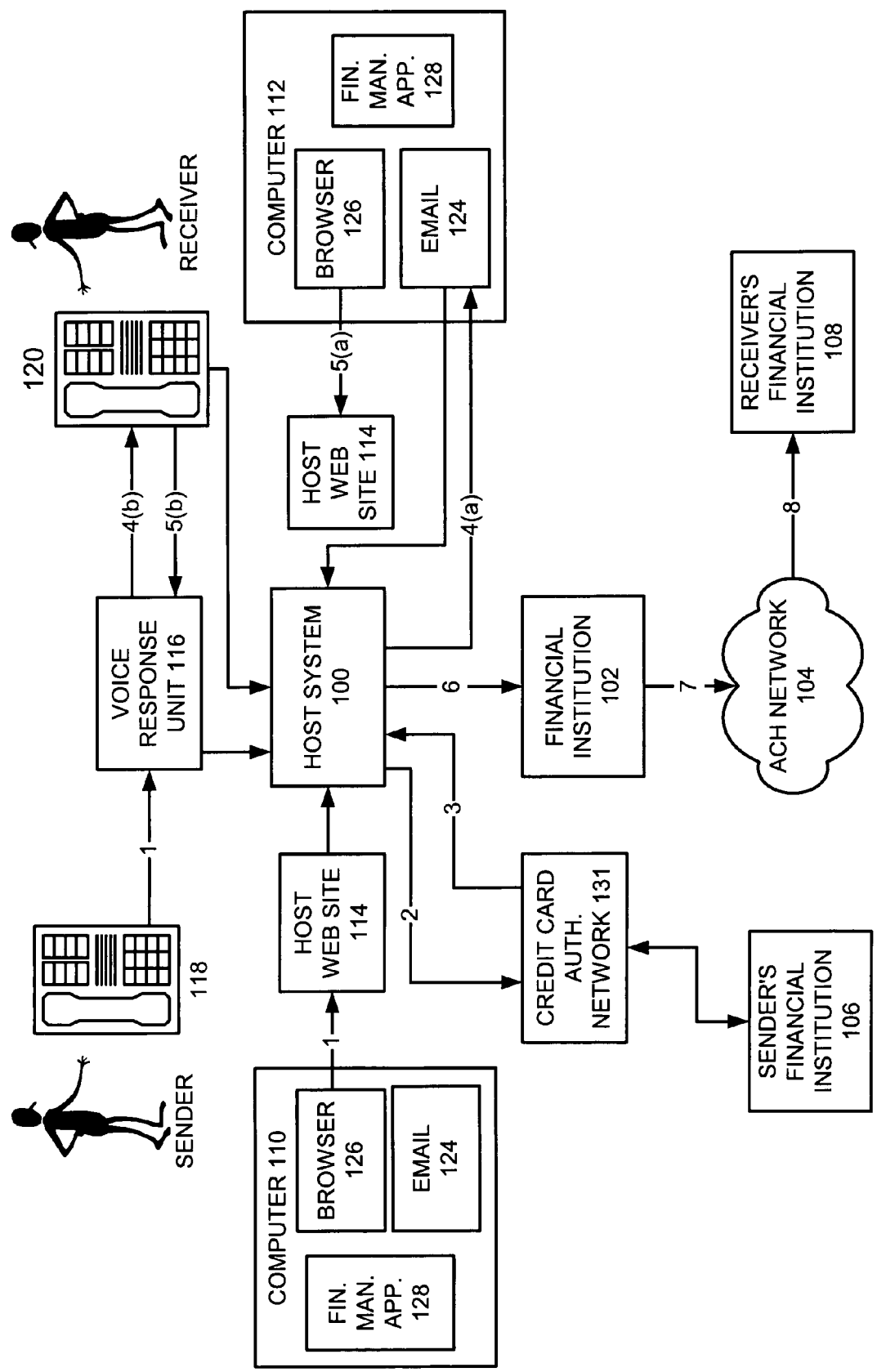
FIG. 12 is a process flow for transferring funds where the source account is a credit card account.

FIG. 12 illustrates the process flow for sender use of credit card accounts. To support the use of credit cards, the host system 100 thus would include the appropriate software and hardware, for interfacing with credit card authorization networks 131 such as provided, example, by Card Services, Inc. and First Data Resources, Inc.

The process begins as before with the sender contacting (1) the host system, as before to initiate a funds transfer to a receiver. Instead of providing a source bank account, the sender provides a credit card account number to the host system 100. The host system 100 first obtains (2) authorization for the transfer amount using the credit card authorization network 131. The funds transfer service is specified as the payee of the credit card charge for the funds transfer. When the charge is approved (3) the host system 100 continues with the funds transfer by contacting (4a, 4b) the receiver and informing them of the availability of the funds. After the receiver replies with their target account (5a, 5b) the transfer of funds to the receiver occurs via the ACH network 104, with the host system 100 providing a request (6) for an ACH credit (7,8) to the receiver's target account. The sender's financial institution 106 is updated (9) to reflect the charge on the sender's account.

A tax refund account is typically set up by a tax preparer, typically as deposit accounts on behalf the tax payer. The tax preparer may then operate the funds transfer service with host system 100 as described above to allow its customers to transfer funds from their tax refund accounts to others.

Different types of target accounts may likewise be used, again such as credit cards. Here, the receiver would specify a credit card account number for receiving the transfer funds. The host system 100 would have previously effected the ACH entries relative to the sender (e.g., steps 2-6, FIG. 3), and so have these funds available at its financial institution 102. When the receiver provides his credit card number (9a, 9b, FIG. 3), the host system 100 authorizes a credit to the receiver's credit card account using the credit card authorization network 131.

H. Implementation Aspects

Referring again to FIG. 13, various implementation aspects of the host system 100 are now discussed.

The request/response processor 210 is preferably implemented as a collection of executable processes or methods. These methods may be logically structured to include the following.

First, a new transfer method is used to generate a new funds transfer between the sender and receiver. The method acquires from the sender the funds transfer information, including the sender's identification information, designation of source account, and receiver contact information. The method updates the user table to store either a new record for the sender or update an existing record, and likewise creates or updates a record for the receiver. The method also updates the transfer table with a new record for the funds transfer, and associates the new transfer with the sender and receiver. The method may then invoke a notify receiver method.

The notify receiver method uses the receiver contact information in the user table to contact the receiver, including generating an email message to the receiver, telephoning the receiver, or the like, depending on the particular embodiment, available system elements and information available about the receiver.

A third method operates to receive the receiver information, including the designation of a target account. This method receives from the receiver some identification of the transfer, which could just be the receiver's email address or a transaction ID as described above, and looks up the appropriate transaction in the database, updates its status to indicate the receiver information is complete (and if necessary updates the receiver's record in the user record).

A fourth method periodically reviews the database to identify transactions for which both source and target account information is available, and then generates ACH instructions (either individual items or batch files) to the appropriate financial institutions to execute the funds transfer. The generation and transmission of the instructions may be delayed as necessary to implement various authentication and/or sufficient funds verification processes. The fourth method may include other methods to generate ACH instructions just for debiting funds from the sender's source account, and separate methods for generating ACH instructions for crediting the receiver's account.

A fifth method is used to authenticate the sender by receiving current account activity information, such as described above, whether the current balance, check number and amount, or the like from the sender, and then obtaining similar information from an automated system. The fifth method makes use of the appropriate interfaces to the POS, online automated systems. The fifth method may further include steps for accessing other online accounts of the sender to authenticate the sender's identity.

A sixth method is used to verify sufficient funds in the source account, and may be implemented to check a current balance via the POS, and to compare this amount with any of a variety of predetermined amounts, including the transfer amount (or a multiple of it) or simply a zero balance.

What is claimed is:

1. A computer implemented method of electronically transferring funds from a sender to a receiver, comprising:

a host system, operating on a conventional computer system and communicatively coupled to a host financial institution that is an automated clearinghouse (ACH) member at which is maintained a host account, receiving from the sender an amount of a funds transfer, a designation of a source account for the funds transfer, and a contact information of the receiver sufficient for contacting the receiver, without receiving from the sender a designation of a target account of the receiver;

the host system contacting the receiver using the information provided by the sender, and informing the receiver that the sender is capable of initiating a transfer of funds to the receiver;

the host system receiving from the receiver the designation of the target account for receiving the funds from the sender after the host system has contacted the receiver using the information provided by the sender; and the host system providing a first instruction to the host financial institution to cause the transfer of funds from the source account to the host account; and the host system providing a second instruction to the host financial institution to cause the transfer of funds from the host account to the target account;

wherein any of the first instruction and the second instruction effects through an ACH network a number of ACH entries to transfer funds;

wherein the sender is not required to have a previously established ACH originator relationship with an ACH member at which the receiver's target account is maintained.

2. The method of claim 1, wherein the designation of the source account includes a routing/transit number and an account number.

3. The method of claim 1, wherein the designation of the target account includes a routing/transit number and an account number.

4. The method of claim 1, further comprising receiving the amount of the funds transfer, the designation of the source account for the funds transfer, and the contact information of the receiver from the sender via a web site.

5. The method of claim 1, further comprising receiving the amount of the funds transfer, the designation of a source account for the funds transfer, and the contact information of the receiver from the sender with an interactive voice response unit.

6. The method of claim 1, further comprising receiving the amount of the funds transfer, the designation of a source account for the funds transfer, and the contact information of the receiver from the sender by email.

7. The method of claim 1, further comprising receiving the amount of the funds transfer, the designation of a source account for the funds transfer, and the contact information sufficient of the receiver from the sender by a message from a financial management application of the sender.

8. The method of claim 1, further comprising:
including in an email to the receiver computer readable data for updating a financial management application of the receiver's with information describing the funds transfer.

9. The method of claim 1, further comprising:
receiving from the sender bill identification information that identifies a bill received from the receiver; and
transmitting the bill identification information to the receiver to aloe the receiver to credit the sender with payment of the bill for the amount of the funds transfer.

10. The method of claim 1, further comprising;
authenticating the sender by:
receiving from the sender a first account balance of the source account;
receiving from an automated system a second account balance of the source account;
comparing the first account balance with the second account balance; and
continuing the funds transfer if the first account balance and second account balance match.

11. The method of claim 10, further comprising:
adjusting the first account balance with at least one current transaction occurring after the second account balance was last updated.

12. The method of claim 10, wherein the automated system is the Automated Teller Machine system.

13. The method of claim 1, further comprising;
authenticating the sender by:
receiving from the sender a check number and an amount for a check drawn on the source account;
providing the check number to an automated system to determine the amount of the check;
comparing the amount of the check received from the sender with the amount for the check received from an automated system to determine whether the amounts match; and
continuing the funds transfer if the check amounts match.

14. The method of claim 1, further comprising:
authenticating the sender by:
receiving from the sender a user name and password for an personal online account of the sender;
attempting to access the sender's personal online account via an online system using the received user name and password; and
responsive to successfully accessing the sender's personal online account, continuing with the funds transfer.

15. The method of claim 1, further comprising:
determining whether there is sufficient funds in the source account to effect the funds transfer without overdrawing the account;
responsive to there being sufficient funds,
providing the instructions to the ACH member to effect the ACH entries.

16. The method of claim 1, further comprising:
determining that the receiver identified by the sender is the sender; and
automatically prompting the sender to provide a target account for the funds transfer.

17. The computer implemented method of claim 1, further comprising:
authenticating the sender by:
receiving a first amount from the sender regarding a financial transaction, wherein the financial transaction is associated with the source account;
comparing the first amount with a second amount, wherein the second amount is associated with the source account; and
authenticating the sender based on at least comparing the first amount with the second amount.

18. A computer implemented method of electronic funds transfer from a sender for paying bills from a business receiver, the method comprising:
a host system, operating on a conventional computer system and communicatively coupled to a host financial institution that is an automated clearinghouse (ACH) member at which is maintained a host account, receiving from the sender:
an amount of a funds transfer for paying a bill from the business receiver;
a designation of the sender's source account for the funds transfer;
a contact information of the business receiver sufficient for contacting the business receiver, without receiving from the sender a designation of a target account of the business receiver; and
payment routing information including at least one of a designation of the business account of the sender with the business receiver or bill identification information of a bill;
the host system contacting the business receiver using the contact information provided by the sender, and informing the business receiver that the sender is capable of initiating a transfer of funds to the receiver;
the host system receiving from the business receiver the designation of the target account for receiving the funds for payment of bills from the sender after the host system has contacted the business receiver using the contact information provided by the sender;
the host system electronically transmitting the source account designation of the sender and the target account designation of the business receiver to the host financial institution, providing a first instruction to the host financial institution to effect a number of ACH entries to cause a plurality of funds transfers from the source account of the sender to the host account, and providing a second instruction to credit the amount of funds transfer to the target account of the business receiver; and
the host system providing the business receiver with the payment routing information of the sender and the amount of funds transfer by the sender to allow the business receiver to credit the sender for the amount of the funds transfer.

19. The computer implemented method of claim 18, further comprising:
authenticating the sender by:
receiving a first amount from the sender regarding a financial transaction, wherein the financial transaction is associated with the source account;
comparing the first amount with a second amount, wherein the second amount is associated with the source account; and
authenticating the sender based on at least comparing the first amount with the second amount.

* * * * *